(12) United States Patent
Taylor

(10) Patent No.: US 8,298,668 B2
(45) Date of Patent: *Oct. 30, 2012

(54) AMBIPHILIC COAL BODY SURFACES

(76) Inventor: David Walker Taylor, Athens, GA (US)

( * ) Notice: Subject to any disclaimer, the term of this patent is extended or adjusted under 35 U.S.C. 154(b) by 606 days.

This patent is subject to a terminal disclaimer.

(21) Appl. No.: 12/378,016

(22) Filed: Feb. 10, 2009

(65) Prior Publication Data

US 2009/0202820 A1    Aug. 13, 2009

Related U.S. Application Data

(60) Provisional application No. 61/065,614, filed on Feb. 13, 2008, provisional application No. 61/207,187, filed on Feb. 9, 2009.

(51) Int. Cl.
*B32B 9/00* (2006.01)
*C10L 5/00* (2006.01)
(52) U.S. Cl. .......................... 428/403; 428/408; 44/500
(58) Field of Classification Search ........................ None
See application file for complete search history.

(56) References Cited

U.S. PATENT DOCUMENTS

| | | | |
|---|---|---|---|
| 4,164,124 A | 8/1979 | Taylor et al. | |
| 4,288,231 A | 9/1981 | Taylor | |
| 4,377,392 A | 3/1983 | Massey et al. | |
| 4,394,132 A | 7/1983 | Taylor | |
| 4,412,839 A | 11/1983 | Taylor | |
| 4,504,274 A | 3/1985 | Anderson | |
| 4,599,089 A * | 7/1986 | Stigsson et al. | 44/280 |
| 4,872,971 A | 10/1989 | Zandona | |
| 5,711,769 A | 1/1998 | Rinker et al. | |
| 2002/0165088 A1 | 11/2002 | Haskew | |

* cited by examiner

*Primary Examiner* — Ramsey Zacharia
(74) *Attorney, Agent, or Firm* — Denton Intellectual Property Law Firm, LLC; F. Russell Denton, Esq.

(57) ABSTRACT

The invention provides compositions of matter comprising coal body surfaces having improved characteristics for hydration and preservation of pristine surfaces, and which are compatible with both hydrophilic and hydrophobic liquid media. The coal body surfaces of the invention facilitate burning at low temperatures, avoiding emissions of nitrogen oxides, and also have improved properties for surfactant-free suspension in either water or oil media, as well as for liquefaction and gasification.

20 Claims, 4 Drawing Sheets

FIGURE 1: Evaporation of Moisture from Coal by Mill with 650 °F, 200 psi Steam Source
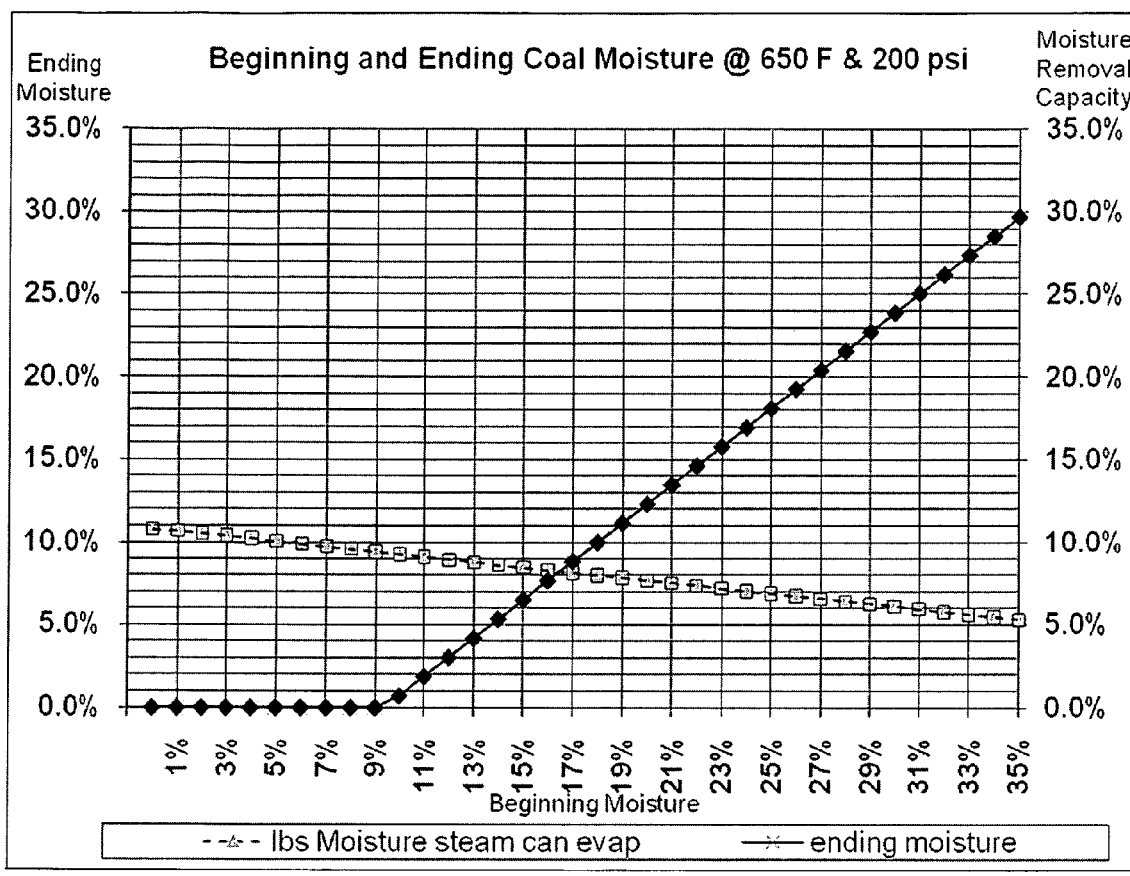

FIGURE 2: Evaporation of Moisture from Coal by Mill with 700 °F, 200 psi Steam Source
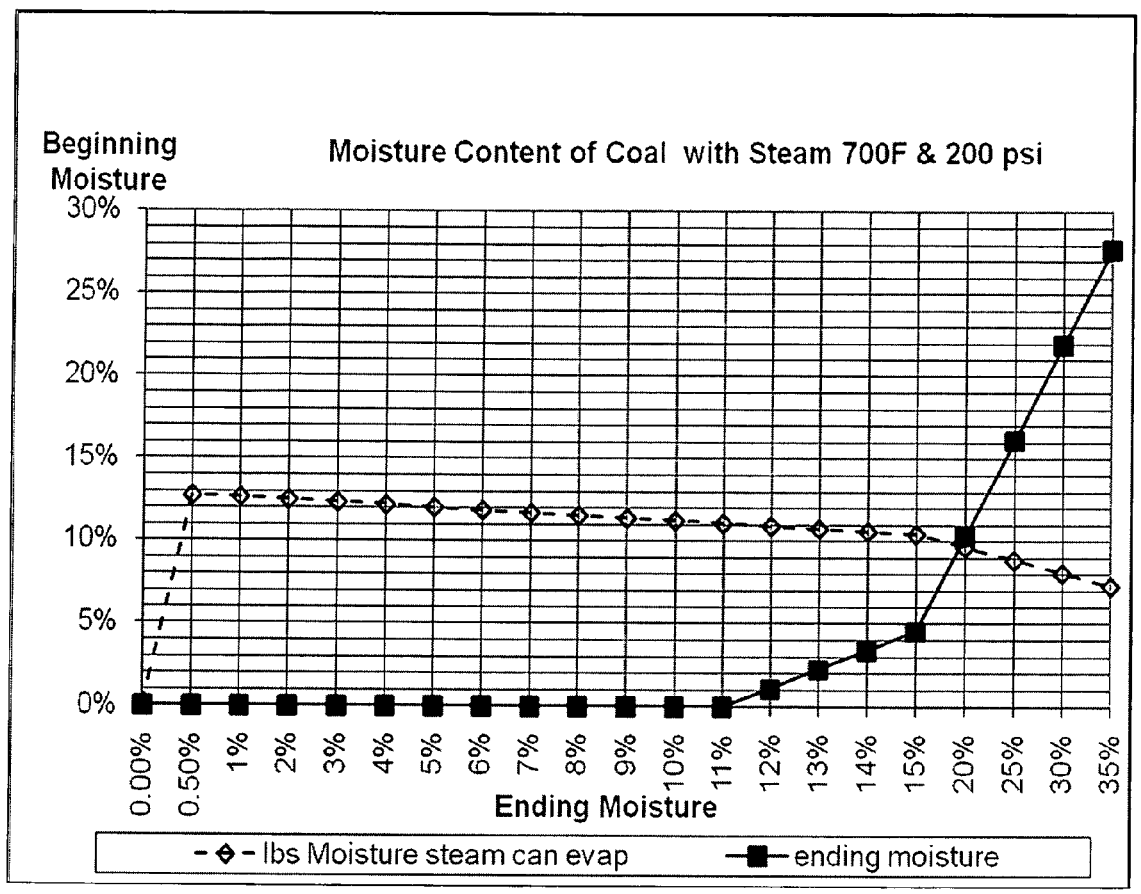

FIGURE 3: Evaporation of Moisture from Coal by Mill with 750 °F, 200 psi Steam Source
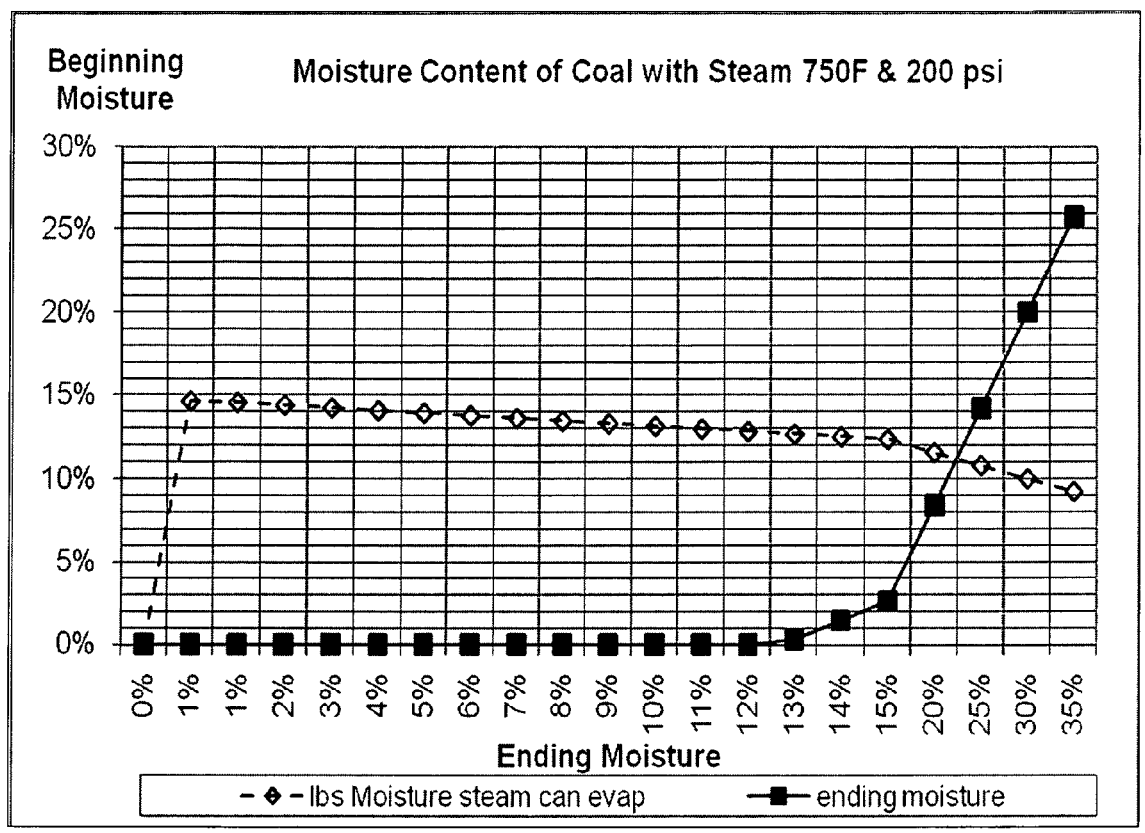

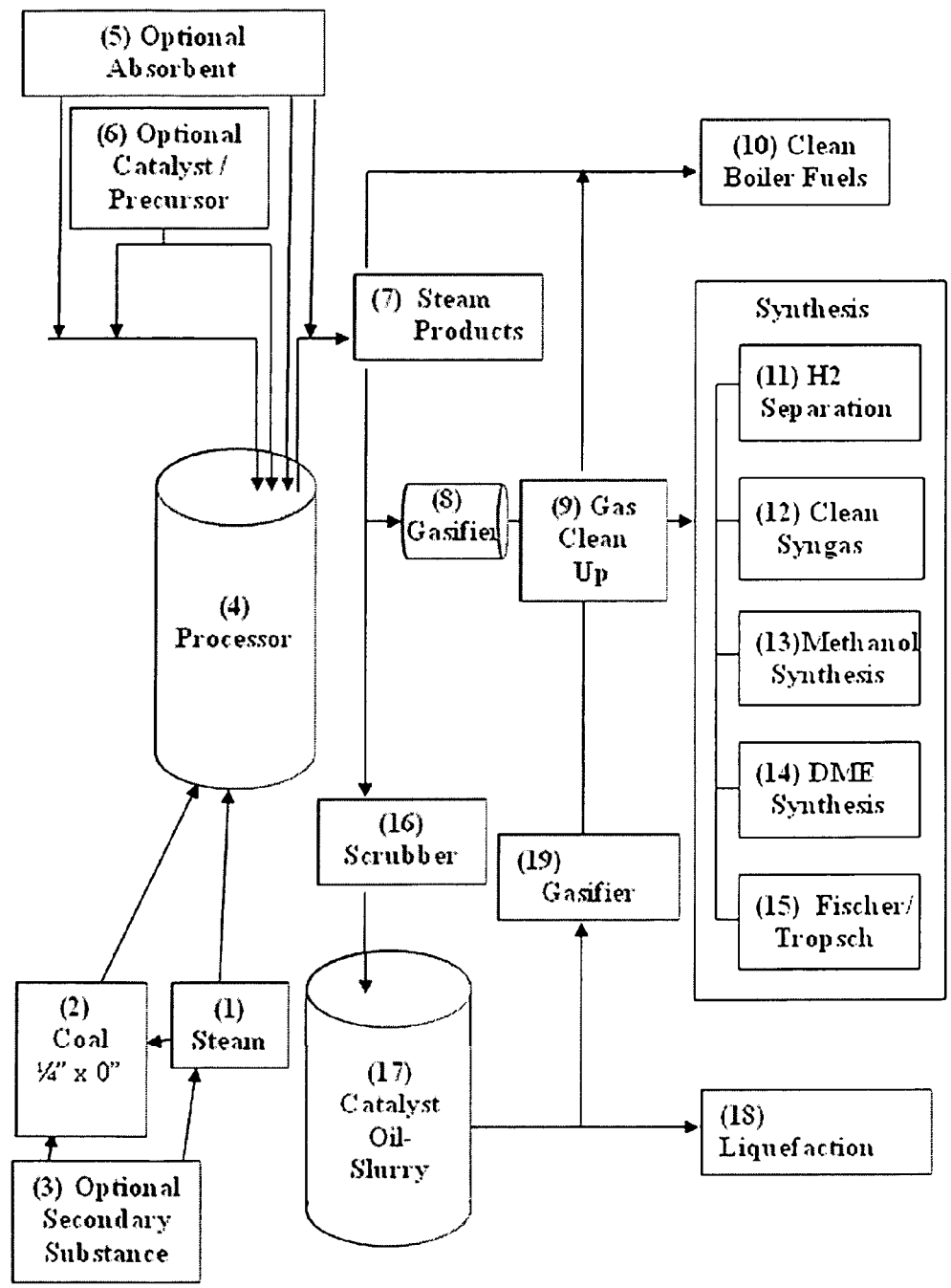
FIGURE 4: Overview of Products and Processes in Illustrative In-Line Configuration

AMBIPHILIC COAL BODY SURFACES

RELATED APPLICATION

This application claims priority to U.S. Provisional Patent Application No. 61/065,614, filed Feb. 13, 2008, and a U.S. Provisional Patent Application No. 61/207,187, filed Feb. 9, 2009, each entitled "Apparatus and Processes for Improved Utilization of Fuel Solids," and incorporates by reference the contents of both applications in their entirety.

FIELD OF THE INVENTION

This application pertains to compositions of matter comprising a coal with improved surface characteristics.

BACKGROUND OF THE INVENTION

Approximately 50% of the energy demand in the United States is currently satisfied by the combustion of coal, and the total energy value of remaining U.S. coal deposits exceeds the energy content of natural reserves for all other types of fuels combined. Retrofitting the national coal infrastructure to use other types of fuels is expected to require many years and enormous investments of new working capital. Indeed, a complete conversion to non-coal energy sources in the near future would drive energy prices to levels that most consumers are not prepared to pay. Thus although the environmental impact of coal use is a source of ongoing controversy, coal will nevertheless remain an important energy resource for the foreseeable future.

The problems with coal use arise partly from its composition and location. Coal, like peat, is a complex biomass material resulting from anaerobic bacterial degradation of accumulated dead plant matter under pressure. Coal is largely carbonaceous, but because of its botanical source coal often contains heteroatoms such as sulfur and nitrogen that undergo chemical processes to form pollutants when burned. The greatest coal reserves are, in fact, the low-ranked varieties having substantial amounts of sulfur and nitrogen. Furthermore the burning of coal converts ambient atmospheric dinitrogen to gaseous brown nitrogen oxides, which are pollutants and characteristic components of smog. And coal combustion also generates large quantities of carbon dioxide, a greenhouse gas that has a role in climate change. Underground coal acts as a type of filter for toxic elements in groundwater, thus coal also contains significant amounts of arsenic, chromium, mercury and radioactive species such as radium.

Direct combustion of coal can also be quite inefficient. This is partly because coal is a very wet material. By weight, coal as mined often contains 30% water or more. When coal is burned in that condition the water is baked off as water vapor in an unrecoverable energy loss unless steps are taken to dry the coal before burning or to harness the energy of the emitted water vapor. Yet even for dry coal the combustion rate is often lower and less uniform than desired.

Coal is also inefficient as a candidate for transport. Traditionally coal has been shipped in lump form by barge or railroad car for long distances. In modern times slurries have been made consisting of approximately 30% finely ground coal by weight in water or light oil; such compositions are suitable for transport by pipeline, and conveniently they are also suitable for burning and can be substitutes for diesel fuel. However slurry generation for a pipeline requires an ample supply of water or oil at the pipeline's outermost point. And conventional coals have many deleterious effects, including eroding and agglomeration, as well as plugging pumps, valves and boiler tubes For many major coal deposits such as those found in the Midwest, that prerequisite often cannot be satisfied.

Conversion of coal to other fuel sources is also energy-intensive. Its gasification requires temperatures above about 1100° F. at atmospheric pressure: most gasifiers currently operate at 2600-2800° F. because lower temperatures produce large quantities of tars, phenols and coke. Direct liquefaction of coal is typically conducted in the range of 650-750° F. and 20 bars of pressure. Catalysts are often used at up to 2 weight percent relative to coal to aid these processes, however such catalysts are not distributed very finely or uniformly in coal mixtures and thus the catalysis efficiencies are hardly optimal.

Traditional milling of coal also entails high maintenance expense, unpredictable downtime and wide, variable particle size distribution because mechanical crushing or grinding causes considerable wear on exposed parts of the mill There is therefore a need for improved coal types, improved combustion processes and related equipment that will result in relatively less pollution, higher efficiency in converting coal to usable energy, higher efficiency in conversion to other fuels, and higher efficiency in milling.

SUMMARY OF THE INVENTION

The invention provides an improved fuel processing device, wherein solid fuels are comminuted by entrainment within a shear field of superheated steam within a reaction chamber, classified in vortexes of steam therein, and then dehydrated to a partial but optimal extent by a hydration modulating unit. Optionally the device may be used to add catalysts; absorbents; reducing agents; and gases such as natural gas, dihydrogen, carbon monoxide, carbon dioxide, syngas, or hydrogen sulfide to the fuel. Inner surfaces of a reaction chamber in the device may be protected by a thermal blanket, insert, tiles, or other protection such that the chamber may be employed under reaction conditions in the range of those required for liquefaction or gasification of fuels. Optionally the device may be in line with a scrubber, gasifier unit, or liquefier unit. Optionally the device may have an apparatus for introduction of fuel particles. And optionally the hydration of the fuel product may be modulated by a governor for metering steam or a cooling mist, or may employ a re-wetting of dried fuel.

Advantages of the comminuted particles include shorter reaction times to complete liquefaction, gasification, combustion and cracking. The particles can also burn at lower temperatures than conventional fuels, burning lower than even conventionally micronized coals and avoiding generation of nitrogen oxide pollutants without compromising energy yields. The uniformity and porosity of the particles of the invention allow them to be processed with more uniform temperatures, faster heating in the particle interiors, and faster mass transfer at virgin coal surfaces. The comminuted particles also have ambiphilic properties enabling surfactant-free suspensions, and have reduced-wear characteristics on mechanical parts.

The invention further provides an improved process for modifying fuel particles, wherein fuel solids up to 3 inches in diameter are comminuted in the shear field at 650° F. or more with an initial steam velocity of 1340 ft/s or more, and are then dehydrated to about 0.5 to 5.0% or more water by weight relative to the fuel solids. The process may optionally coat the external and internal surfaces of the resulting particles with one or more substance that catalyze or are catalyst precursors for combustion, gasification, methanation, or liquefaction. The invention also provides a process for making improved suspensions of fuel solids in liquid media by adding the comminuted dried particles to liquid media directly, or by scrubbing superheated steam in liquid media in which the fuel particles are entrained. The fuels may be coal, biomass, synthetic polymers, petroleum coke, and or other fuel solids.

The invention also provides an improved type of ground coal having an advantageous hydration layer, and having the same or better low density, surface area and porosity than the native, unground coal, instead of being compromised as in conventionally ground coal. The improved type of ground coal can burn essentially completely at a lower temperature than conventional coal, thereby avoiding formation of nitrogen oxide compounds from ambient atmospheric nitrogen, and can also be hydrocracked essentially completely at a lower temperature than conventional coal. The coal of the invention forms stable suspensions without surfactants in both hydrophobic and hydrophilic liquid media; these suspensions may be burned, gasified or liquefied readily. The improved coal may optionally contain catalysts at its interior and or exterior particle surfaces. The invention also provides an improved low-pollution fuel for combustion.

Moreover, the invention provides an improved coal body surface or resinous wood body surface in which the surface is ambiphilic, and also has a beneficial hydration layer. The hydration layer prevents aggregation between coal particles, thereby making them more susceptible to heat transfer to the inner cores of the particles and thus better able to burn at low temperatures, and the hydration layer also reduces coal aggregation. The porosity and ability to use uniform application temperatures facilitates devolatilization and avoids conversion to tars and other unwanted byproducts. The hydration layer is believed to be stable up to 300° C. (ca. 570° F.) at ambient pressure. Optionally the hydration layer may also contain a catalyst, absorbent, hydrogen-donating organic substance or other substance dissolved in or otherwise disposed in or at the hydration layer.

The invention provides an improved process for combustion wherein fuel particles made according to the improved modification process above burn at a temperature low enough to avoid creating nitrogen oxide thermal byproducts from deleterious oxidation of atmospheric nitrogen. The particles may optionally also contain combustion catalysts.

The invention also provides for injection of liquefying gases such as hydrogen, carbon monoxide, carbon dioxide and or low alkanes into the grinder to facilitate rapid liquefaction. The invention further provides an improved process for liquefaction wherein fuel particles made according to the improved modification process above contain catalysts for hydrogenation and or cracking, and wherein the cracking catalysts are relatively inert until the cracking phase of a thermal step function treatment. The improved process has accelerated liquefaction rates for liquid medium suspensions under standard liquefaction conditions. I.e., carbon monoxide and hydrogen pressure are used in the dissolution temperature range of ambient to 650° F. The process reduces the dissolution product with dihydrogen and or a hydrogen donor solvent, using a catalyst such as molybdenum sulfide or iron sulfide in the temperature range 650-750° F. with reaction times of an hour or less. Optionally, the process cracks the remaining fuel in the temperature range 750-950° F. in the presence of hydrogen and the substantial absence of carbon monoxide, though carbon dioxide may optionally be present, using a cracking catalyst such as aluminum oxide. Because the process employs starting fuel solids in which refractory bonds are substantially absent and avoids introducing them, the cracking step may be avoided entirely as desired.

The invention also provides an improved device and corresponding process for gasification wherein fuel particles made according to the improved modification process above can be gasified in the substantial absence of oxygen. That is, the process is driven by efficient allothermal processes involving externally applied heat as opposed to autothermal processes involving the partial burning of coal at the outset. The invention further provides slurries based on fuel microparticles, wherein the slurries produce very little wear on mechanical parts at high flow velocities. The invention moreover provides uniform dispersions of catalysts in fuels as provided to the gasifier unit, resulting in rapid, uniform and fuel efficient gasification. Furthermore, the fuel solids as provided are non-agglomerating. And heat recuperation from the process is sufficient to generate steam for grinding.

BRIEF DESCRIPTION OF THE FIGURES

FIG. 1 provides an illustrative embodiment of a calculation for the dehydration of comminuted coal using a steam source 650° F. (ca. 340° C.) and 200 psi by the invention apparatus and method of using it.

FIG. 2 provides an illustrative embodiment of a calculation for the dehydration of comminuted coal using a steam source 700° F. (ca. 370° C.) and 200 psi by the invention apparatus and method of using it.

FIG. 3 provides an illustrative embodiment of a calculation for the dehydration of comminuted coal using a steam source 750° F. (ca. 400° C.) and 200 psi by the invention apparatus and method of using it.

FIG. 4 provides an illustrative embodiment of products and processes by the invention apparatus and method of using it an in-line configuration for grinding, loading particles with catalyst, and further processing of fuels.

DETAILED DESCRIPTION OF THE INVENTION

Surprisingly it has been discovered that creation of a hydration layer on the surfaces of solid fuels under certain conditions alters their surface properties in a stable and beneficial way. These hydration layers enable them to be more efficiently and selectively reacted during combustion, liquefaction and gasification, and to be stored in suspensions more stably. The fines are pyrophoric when dry, thus the improved properties for handling in suspensions offer important advantages. Also, the hydration layers are relatively robust, and are believed to be stably adsorbed to carbonaceous fuel surfaces up to temperatures of approximately 570° F. (300° C.). Apparatus and methods for creating and using these surface-hydrated fuels are described below. In addition, the loading of particles with catalyst in the grinder provides improved distribution and adhesion of catalyst to particles. And particles manufactured by the invention method can also be burned efficiently with good energy yield at low temperatures and greatly reduced pollution. Definitions of the terms as used herein are provided below.

Definitions

The term "housing" as used herein refers to a physical casing for an apparatus or a part thereof. Where a reaction chamber is contained within the housing, the housing may be distinct from or alternately of one piece with the walls of the reaction chamber.

The term "reaction chamber" as used herein refers to a compartment within which a fuel is comminuted, chemically coated or chemically reacted. The term "internal surface"

with respect to the chamber refers to the inside surfaces of the walls of the chamber. The term "insulating mantle" refers to a thermal liner which is optionally used to insulate the internal surfaces of the chamber. The terms "insulating blanket," "insulating tile," and "insulating insert" likewise refer to thermal liners optionally used to insulate the internal surfaces of the chamber.

The terms "apparatus for introducing" and "apparatus for introduction" as used herein refers to an apparatus by which a substance may be introduced continuously, intermittently or alternatively occasionally into a reaction chamber.

The term "superheated steam" as used herein refers to steam that is provided at a temperature exceeding the boiling point of water at ambient pressure. The term "superheat" as herein represents the excess of heat above the boiling point of water, which is 212° F.; thus instance steam at 250° F. represents only 38° F. of superheat.

The term "dry steam" as used herein refers to steam that is provided at a temperature and pressure above the corresponding critical levels for condensation.

The term "milling medium" as used herein refers to a gas such as steam, carbon dioxide, carbon monoxide, hydrogen, dinitrogen or other gas or combination of gases in which fuel particles are entrained for the purpose of comminution.

The term "decompression ratio" as used herein when used with regard to the flow of steam or another gas refers to the change in pressure between the source and output during flow. As an example, steam that is maintained at a pressure of 1.5 atmospheres at the source and 1.0 atmospheres in the output region has a decompression ration of 1.5:1.

The term "shear field" as used herein refers to the boundary between slow-moving and fast-moving aerodynamic zones in the grinding chamber.

The term "vortex" as used herein refers to a distribution of steam or other gas flowing in a cyclical manner within a housing; vortexes are shed by the shear field. In a particular embodiment a shear field and vortexes of steam are provided by means of nozzles distributed at regular intervals around a circle located on a horizontal plane; the nozzles are each directed 12.5° above the plane of the horizontal, and at 12.5° all clockwise—or all counterclockwise—relative to the radius from the center of the circle. In such an embodiment the shear field and vortexes are formed when a cone of steam from each nozzle intercepts the recirculation stream at the perimeter of the reaction vessel's interior, which is relatively quiescent.

The term "revolution" as used herein with respect to a shear field or vortex refers to one complete turn around the shear field or vortex.

The term "central axis" as used herein with respect to a shear field or vortex refers to the axis about which steam in the shear field or vortex revolves.

The term "trajectory path" as used herein with respect to a shear field or vortex refers to the trajectory of steam and or entrained solids in the steam at a respective point in the shear field or vortex.

The term "nozzle" as used herein refers to an apparatus through which steam flows from a pressurized source into a reaction chamber.

The term "entrain" as used herein with regard to a solid in steam refers to the transport of the solid in or by the steam. For a steam shear field or steam vortex in a reaction chamber the solid may be entrained in the steam either before entering the chamber or after being introduced to the reaction chamber; optionally the solid may be added to a steam shear field or vortex that has already been formed. A "means for entraining" a solid in steam may for instance be a pipe providing steam under pressure to drive the solid into a reaction chamber.

The term "mass:heat ratio" as used herein refers to the relationship between the mass and the absolute amount of heat contained in one or more fuel solids. In particular the term is used herein to refer to the mass:heat ratio present at the end of comminution, and the amount of superheat required to evaporate most or all of the water contained in a comminuted fuel solid.

The term "in-line" as used herein with respect to apparatuses and processes refers to a relationship between apparatus units in which material is transferred through one or more direct sequential steps from one process to another. Thus a grinding apparatus is in-line with a liquefaction unit whether the vented steam product is routed directly into the liquefaction unit, or is treated first in scrubber and slurry units and then routed directly to a liquefaction unit. As contemplated herein the term "in-line" includes automated inventorying and release of intermediate products, such as where a slurry is sent to a holding tank until a liquefaction unit is ready to accept the product for chemical conversion.

The term "hydration-modulating unit" as used herein refers to an apparatus for altering the moisture content of fuel solids that are static or entrained in steam or another gas, in order to provide a finite low amount of moisture on the surface of solids following evaporation of any steam present.

The term "governor" as used herein refers to a device for imposing a ceiling level on heat transfer to or from steam.

The term "cool water spraying unit" as used herein refers to a spraying unit that provides water at a temperature below the ambient boiling point of steam.

The term "apparatus for re-wetting" refers to an apparatus for providing up to 5% water by weight of dehydrated or anhydrous fuel. Non-limiting examples of such apparati include: "misting units" that provide sprays of liquid water, "steaming units" that provide steam exposures, and "sub-saturation humidifying units" that provide a humid gaseous medium.

The term "dehydrated" refers to a substance from which most or all of the water has been removed.

The term "semi-dehydrated" refers to a substance from which less than all of the water has been removed.

The term "anhydrous" as used herein refers to the substantial absence of water.

The term "bone dry" as used herein is synonymous with the term "anhydrous".

The term "spray dry" as used herein refers to spraying a suspension of solids in a liquid medium, wherein some or all of the liquid is evaporated during spraying.

The term "fuel" as used herein when used with respect to solid fuels refers to coal, biomass, and other carbonaceous fuels. The term "fuel" as used herein refers to materials that may be combusted directly or whose modified materials may be combusted; alternatively the term "fuel" refers to materials whose energy may be captured by a non-combustion reaction such as in a fuel cell. The term fuel as used herein includes substances that may be used as a fuel but which are used as a non-fuel feedstock, e.g., as a chemical feedstock. It is contemplated that in some applications fuels may be converted to another fuel form; nonexclusive examples include the conversion of coal to a combustible gas, and conversion of biomass first to sugars by hydrolysis and then to ethanol by fermentation.

The term "coal" as used herein refers to anthracite, bituminous, subbituminous, and lignite coals, and peat.

The term "petroleum coke" as used herein refers to a carbonaceous solid derived from oil refinery coker units or other petroleum cracking processes.

The term "biomass" as used herein refers to matter which originates from a biological source and which may be used as a fuel source. As used herein, the term biomass includes sawdust, wood, pulp, bark, paper, straw, lignin, chaff, bagasse, agricultural waste, forest waste, yard waste, mulch, microbial biomass, fishery waste, feathers, fur, hoofs, manure, and other biomass such as is familiar to the person of ordinary skill in the biomass art.

The term "run of the mine" as used herein with respect to coal refers to coal just as it comes from the mine, containing both large and small pieces, and with all qualities together as obtained from the mine.

The term "nugget" as used herein refers to a piece of fuel having a rock-like shape and being less than about 4 inches in diameter. The term nugget as used herein also encompasses particle classifications known by other names in the art, including coal particles denominated respectively as rice, buckwheat, pea, nut, stove, egg, broken, stoker coal, slack, and comparable terms.

The term "comminution" as used herein refers to the act of breaking solids into smaller pieces, without regard to the method used or the characteristics of the products other than size.

The term "feed coal" as used herein refers to nuggets of coal fed into the processor of the invention.

The term "grinding aid" as used herein refers to a hard particulate material used to enhance abrasion and comminution in the process or the invention. Exemplary grinding aids include sand, silica, alumina, metallic or carborundum grit; the term may also refer to the inclusion of small coal solids for aiding the grinding of soft fuels such as biomass or synthetic polymers.

The term "grit" as used herein refers to hard inorganic or carbonaceous particles for use in grinding.

The term "particle" as used herein refers to a small solid, which may or may not be a product of comminution. The term as used herein is not limiting with regard to size ranges.

The term "microparticle" as used herein refers to particles that are in the range of 40 microns or less in average diameter.

The term "secondary substance" as used herein refers to a composition of matter other than the fuel solids, wherein the secondary substance is simultaneously present with the fuel solids in the reaction chamber. Illustrative examples of secondary substances include grinding aids, catalysts, catalyst precursors, absorbents, and reducing agents, among other substances. Exemplary secondary substances include gases, such as natural gas, hydrogen gas, carbon monoxide, carbon dioxide, syngas, methane, and other gases and gaseous mixtures. When desired, steam may be introduced as a secondary substance, for instance if carbon dioxide is the medium in which coal is entrained during milling.

The term "catalyst" as used herein refers to a first compound that facilitates the conversion of a second compound to a third compound, but wherein the catalyst is recovered substantially unchanged.

The term "catalyst precursor" as used herein refers to a substance that is converted to a catalyst by conditions that occur in a process after the introduction of the catalyst precursor.

The term "absorbent" as used herein refers to a substance that traps or captures heteroatoms such as sulfur, nitrogen or oxygen atoms from the fuel. Examples of absorbents herein include carbon monoxide, calcium oxide, magnesium oxide, copper hydroxide, and zinc oxide.

The term "reducing agent" as used herein refers to a substance that donates electrons or hydrogen to a substrate compound. The terms "hydrogen donor," "hydrogen-donating organic substance," "substance that can serve as a source of hydrogen transfer," and "molecular species that is capable of donating one or more of its hydrogen atoms," as used herein are interchangeable and refer to a substance from which hydrogen is transferred to a substrate. These terms as used herein are not limited by the state of the hydrogen when it is transferred, whether as monatomic hydrogen radicals, protons, hydride anions, or complexed hydrogen.

The term "natural gas" as used herein refers to fossil fuel gases found in nature including primarily methane but also other low alkanes and other compounds found in natural gas. The term natural gas as used herein is not exclusive of synthetic mixtures that mimic the natural gas found in nature.

The term "synthesis gas" or "syngas" as used herein refers to a mixture of carbon monoxide and hydrogen gas.

The term "recycle oil" as used herein refers to oil that is reclaimed from a conversion process, for instance from liquefaction, and which is further used for another iteration of chemical conversion in the same process or another conversion process. The term recycle oil as used herein can be used interchangeably with another term of art in the industry, "process-derived oil".

The term "low alkane" refers to saturated hydrocarbons having up to five carbon atoms in their molecular formula.

The term "nickel steel" and "carbon steel" as used herein refers have their ordinary meaning in the art of mettalurgy.

The term "refractory" as used herein refers to materials and chemical bonds that can withstand decomposition at high temperatures. Thus refractory bonds resist reactions and cracking or hydrocracking. With regard to combustion, the term "refractory" as used herein refers to bonds that require burn temperatures over 2600° F. With regard to catalytic hydrocracking, the term "refractory" as used herein refers to bonds that require reaction temperatures over about 840° F. (450° C.) at a hydrogen gas reaction pressure of 500 psi in the presence of hydrocracking catalysts.

The term "scrubber" as used herein refers to an in-line apparatus for capturing gas-entrained solids as a suspension in a liquid medium, where the gas may be steam or another gas.

The term "scrub" as used herein refers to blowing steam effluent into a liquid medium in a scrubber.

The term "humid" as used herein refers to a gaseous atmosphere in which water vapor is present.

The term "combustion" as used herein refers to the burning of a fuel in the presence of oxygen, in which the oxygen may be provided from air or another source. With respect to fuels such as coal steam and natural gas, the term "combustion" as used herein includes the conversion of the fuel to syngas during combustion, and subsequent burning of the syngas.

The term "in the presence of oxygen" refers to the availability of dioxygen in the surrounding medium, whether in the form of air, other dioxygen-containing gas, or dioxygen-containing liquid.

The term "gasification" as used herein refers to conversion of a solid or liquid carbonaceous fuel such as coal, petroleum or biomass into carbon monoxide and hydrogen by reacting the raw material at high temperatures; the resulting gas mixture is called "synthesis gas" or "syngas" and is itself a fuel. Whereas conventional gasification methods require the presence of some oxygen (optionally from air) for oxidation during gasification, the term "gasification" is not so limited when used with reference to the present invention.

The term "liquefaction" as used herein as used herein refers to conversion of a solid fuel into a liquid fuel such as gasoline, diesel, or other liquid hydrocarbon fuels. The term liquefaction as used herein includes both direct conversion of solid to liquid fuels, and indirect conversion whereby solid fuels are first gasified and then the gases are polymerized to form liquid fuels. The term "direct coal liquefaction" or DCL as used herein refers to deconstruction of complex coal macromolecules by heat, pressure, and catalytic hydrogenation. The term "indirect coal liquefaction" or ICL as used herein refers to coal gasification followed by polymerization of the gas to form liquid fuels.

The term "methanation" as used herein refers to catalytic processes that convert carbonaceous compounds to methane, including catalytic processes that yields methane from syngas (i.e., carbon monoxide and hydrogen) starting material, whether in simultaneous or sequential reaction steps.

The term "dissolution" as used herein with respect to liquefaction refers to the process of dissolving fuels by breaking their bonds to heteroatoms during reaction with carbon monoxide or another reducing compound.

The term "heteroatom" as used herein has its ordinary meaning in organic chemistry, and for instance includes nitrogen, sulfur, and oxygen atoms.

The term "beneficiation" as used herein refers to removal of one or more heteroatoms from a fuel solid composition, and or refers to the removal of ash, mercury or water from that composition.

The terms "suspension" and "slurry" as used herein refer to a suspension of solids in a liquid medium, and are interchangeable. The terms suspension and slurry as used herein are not limited to a particular type of liquid medium.

The term "oil suspension" as used herein refers to a suspension in which the liquid medium is hydrophobic such as a number 6 oil, recycle oil, donor solvents, and other hydrophobic media.

The term "aqueous suspension" as used herein refers to a suspension in which the liquid medium is primarily aqueous. The term aqueous suspension as used herein includes both water-based suspensions, and also includes suspensions of fuels in so-called "black liquor" containing high amounts of lignin and or related byproducts from paper mill waste in addition to the suspended solid fuel.

The term "oil-&-water suspension" as used herein refers to a suspension having substantial proportions of both water and hydrophobic substances comprising the liquid media.

The term "stable" as used herein with respect to a suspension of solids refers to the substantial absence of precipitation of solids from the suspension over a period of at least a week.

The term "surfactant" as used herein refers to a substance that is used to prevent precipitation of solids in a suspension.

The term "black liquor" as used herein has its ordinary meaning in the pulp and paper industry.

The term "ambiphilic" as used herein refers to the property of surfaces being compatible with, that is able to remain suspended in, both hydrophobic liquid media and hydrophilic liquid media.

The term "hydrophilic" as used herein refers to surfaces that permit wetting by aqueous media, or refers to non-aqueous liquid or gaseous molecules that can be mixed with aqueous media in a uniform phase to a substantial extent.

The term "hydrophobic" as used herein refers to surfaces that repel wetting by aqueous media, or refers to liquid or gaseous molecules that cannot be mixed with aqueous media in a uniform phase to a substantial effect.

The term "oleophilic" as used herein refers to surfaces that permit wetting by hydrophobic media, or refers to non-aqueous liquid or gaseous molecules that can be mixed with hydrophobic media in a uniform phase to a substantial extent.

The term "coating" as used herein with respect to fuel particles refers to a deposit or dispersion on the surface of the fuel particles whereby a substance that is different from the fuel comprises a substantial amount of the coating, deposit or dispersion. Exemplary coating substances include catalysts, catalyst precursors, and absorbents. As used herein the term coating encompasses both adhered laminar coatings and adhered particulate matter. The term "coating" as used herein further contemplates deposits comprised of pure, mixed, blended, or layered substances.

The terms "deposit" and "dispersion" as used herein are interchangeable, and refer to the distribution of a first substance onto a particle of a second substance. The terms "deposit" and "dispersion" as used herein neither indicate nor contraindicate adhesion or bonding between the distributed first substance and the particle of the second substance.

The term "native coal" as used herein refers to coal in its original state as mined and without further treatment.

The term "carbonaceous infrastructure" as used herein with respect to a fuel refers to the density of the non-volatile organic phase irrespective of the presence of water or organic volatile substances in the fuel. In other words, the density of the organic structure refers to the density of structure associated with the fixed carbon.

The term "fixed carbon" as used herein refers to the carbon atoms in the carbonaceous matter that remains after water and volatile components have been removed from a fuel solid.

The terms "volatiles" or "volatile matter" as used herein refer to the material in a fuel solid that may be removed by heating or solvent extraction. With respect to coal, the terms "volatiles" or "volatile matter" as used herein have their standard meaning in that art. For standard volatilization test conditions, temperatures of 1640° F. (895° C.) to about 1785° F. (975° C.) are applied in the absence of air over a period of several minutes to remove volatile components except moisture, but these are not limiting temperatures for the term "volatiles" or "volatilization" as used herein; devolatilization commonly begins at temperatures as low as 600-700° F.

The term "porosity" as used herein with respect to a fuel refers to the porosity of the non-volatile organic phase irrespective of the presence of water or organic volatile substances in the fuel. Porosity includes both the volume of space in exposed pores at the surface as well as the internal porosity and channels within a particle. To the extent that a fuel particle's pores are collapsed in the absence of water or volatiles or where particles are crushed by grinding, the internal porosity is reduced and the volume of pores exposed at the surface may be reduced as well. When the term porosity is used herein with respect to flow through interstitial spaces between neighboring particles, it refers to the interstitial spaces between the particles.

The term "surface area" as used herein with respect to a fuel refers to the surface area of the non-volatile organic phase irrespective of the presence of water or organic volatile substances in the fuel. The term includes the area of organic phase surfaces internal to fuel solids. For fuel solids whose phases collapse in the absence of water or volatiles or where particles are crushed by grinding, the internal surface areas are reduced.

The term "interface" as used herein with the surface area of a fuel solid refers to the region of the fuel solid that is immediately physically adjacent to and juxtaposed with a secondary substance.

The term "covered" as used herein with respect to the surface area of a fuel solid refers to the area of the fuel solid that has a direct interface with a secondary substance. Where a secondary substance is embedded in a fuel solid, the term "covered" refers to the cross-section defined by the outer perimeter where the fuel solid and secondary substance meet, as opposed to the three-dimensional interface between the fuel and secondary substance in the embedded region.

The term "eclipsed" as used herein with respect to the surface area of a fuel solid refers to the area of the fuel solid that is directly beneath a deposited secondary substance though that portion of a particle of secondary substance may not be in actual contact. By way of analogy, if a surface of a fuel solid is illuminated from a perpendicular direction, the eclipsed region would be the portion of fuel surface that is in the shadow of deposited secondary substance but does not have an actual interface with the secondary substance there. As defined herein, the combination of covered and eclipsed surface area for a secondary substance on a fuel solid represent the full extent of dispersion of the secondary substance on a fuel solid surface.

The term "surface" as used herein refers to the outer boundary of a solid or liquid composition, or to a layer constituting or resembling such a boundary. The term "external surface" as used herein with respect to a particle, refers to the surfaces at its exterior, as opposed to the surface of a pore within the particle, which is referred to herein as an "internal surface". Where channels, pores or other void spaces permeate a particle and are visible within it, the external surface is defined to include all surfaces at the outermost faces of the particle, but not surfaces that define the channels, pores or other void spaces.

The term "cracking" or "hydrocracking" as used herein refers to the use of high temperatures and or hydrogen gas pressures to break larger molecules into smaller molecules The term "refractory organic bond" refers to a bond in an organic molecule that cannot be hydrogenated at conventional liquefaction or gasification temperatures, or which require temperatures of 2600° F. or more for combustion.

The term "coal body" as used herein refers to a particulate coal solid. The term "coal body surface" as used herein refers to interior and exterior surfaces of the coal body. For example, a coal body with internal pores would have coal body surfaces at the boundaries of those pores, though the pores may be isolated.

The term "hydration layer" as used herein refers to thin layers of water on interior and or exterior surfaces of a fuel solid.

The term "ambiphilic hydration layer" as used herein refers to a hydration layer that is distributed on a fuel solid surface in a manner that permits the fuel solid to form stable associations with hydrophilic liquid media and with hydrophobic or oleophilic liquid media, such that the fuel solids may form stable suspensions in either type of medium. The term "ambiphilic hydration layer" does not connote that the water molecules in the hydration layer are themselves necessarily responsible for the hydrophobic or oleophilic character of the hydrated fuel solid surface.

The term "molecular monolayer" as used herein refers to a layer of a substance one molecule thick on the surface of a solid.

The term "solvation layer" as used herein refers to a layer of solvent molecules which form an oriented or quasi-oriented array in association with a hydration layer. That is, the hydration layer would be sandwiched on one side by a solid fuel surface and on the other by a solvation layer. The term solvation layer herein may refer to a hydrophilic species such as water molecules, or such as a hydrophobic species such as oil molecules.

The term "reactive site" as used herein refers to a molecular feature on a solid fuel surface which is particularly amenable to combustion reactions and or to other chemical conversion.

The terms "aggregation" and "agglomeration" as used herein are synonymous and refer to an ongoing physical association between two or more particles.

The term "adsorb" as used herein refers to the formation of a stable physical association between a substance and the surface of a solid.

Theory Behind the Discovery and Invention

It has been discovered unexpectedly that a certain process and its permutations provide solid fuel particles that have remarkable properties. For instance, cleanly broken surfaces are provided, which in the absence of atmospheric contamination, and in combination with a surface hydration layer, impart several unusual but highly useful characteristics to these fuels. For instance, anhydrous fuel particles from the invention that are rehydrated at their surfaces lose their tendency to aggregate. Such particles also show an ability to remain stably suspended in both hydrophobic liquid media and hydrophilic liquid media. The microparticles that have been created this way and are either entrained in steam or protected by it with hydration layers undergo combustion at lower temperatures and thus avoid thermal formation of nitrogen oxides from dinitrogen in the ambient atmosphere, in fact when suspended in steam their flame is colorless, transparent and clean in appearance like that of natural gas. Likewise, microparticles having hydration layers are converted more readily to alternative fuels by liquefaction or gasification. Micronized fuels that have been created and protected with hydration layers also burn and otherwise react more uniformly than do comparable fuels lacking such layers. The hydration layers also aid in coating solid fuels with catalysts and other compounds. The hydration layers appear to be most effective when they are formed on solid fuel surfaces on which dioxygen has not had a chance to adsorb or react.

Without being bound by theory, an explanation in this and following paragraphs is offered to rationalize these various phenomena. Ordinary grinding of solid fuels such as coals (such as "standard pulverized coal" (SPC)) and such as resinous wood results in crushing of their native structure, collapsing or sealing the internal pores irreversibly, reducing the surface area available for chemical reactions. That crushing also squeezes oils and tars out of pores and smears them on the particle surfaces, making them hydrophobic. The crushing also produces "mechanochemistry," in which shearing of molecular structure produces organic radicals at newly exposed surfaces. Some of these radicals form refractory bonds by recombination, for instance when aryl radicals combine; such aryl-aryl bonds are usually not present in most organic solid fuels such as coal, and they can also result in covalently-held aggregation between particles. Others of these radicals can disproportionate to form refractory bonds. Where electron transfer or other charge transfer occurs upon impact, static charge fields may form, causing aggregation of particles. And the radicals can react with atmospheric oxygen to form peroxides and other unstable compounds, resulting in extensive cross-linking of the structure, refractory three-dimensional networks in the fuel, and refractory carbon-oxygen bonds at the surfaces. Some abstraction of hydrogen atoms is also expected from reaction by these radicals. Because the refractory bonds require elevated temperatures for burning, cracking or other chemical conversions, such fuels cannot be used efficiently except at high temperatures and or high pressures. The high temperatures, in turn, are associated with a drop in process economies, and with further increases in refractory properties because of slow heat transfer through the bulk of a particle.

By contrast, the effectiveness of the current method is rationalized in part by noting the velocities of the invention method. The particle momentum at impact is believed to impart kinetic energy at such a high velocity than it cannot be defused on the time scale of an elastic deformation of pore walls, or by the viscous flow of tar-like so-called "volatiles" that are found in coal. Thus instead of a collapse of pores throughout the material, and instead of the displacement of tars and consequent filling of pores as might occur in conventional grinding, it is believed the walls of the pores nearest to the impact point are simply shattered or sheared in the invention method. The breakage is believed to be further aided by the superheat of the steam medium used: by analogy to popcorn, this is believed to cause water-filled pores to explode as the internal water is rapidly heated well past its boiling point. Such steam explosion is also believed to expand nano-fissures in the materials to produce new or significantly enlarged pores. Normally the internal heating would be relatively slow, however heat transfer to the interior of fuel solids can be extremely rapid for particles having sub-millimeter diameters such as those generated within the mill.

And again without being bound by theory, the anaerobic conditions present in the mill and the hydration layers formed there are herein believed to shield radicals formed at solid fuel surfaces during and after grinding. This shielding minimizes the tendency for radicals to combine with dioxygen. That in turn reduces the tendency of fuel solids to form internal cross-links and thus eliminates one mechanism for porosity reduction during grinding. The water is further believed to dissipate the effect of any static charge that builds up.

By retaining much more of the native porosity and internal and external surface area of the fuel solids, and by expanding it, the present invention is believed to offer a greater surface area for combustion, cracking, and other chemical reactions. The internal porosity of coal is thought to have as much as 100-1000 times as much surface area as the external surface, thus this is a non-trivial advantage. High surface areas enable faster and more uniform consumption of the fuel during these reactions, and also enable a more consistent and efficient transfer of energy to and from the solid particles during these reactions. The efficiency of heat transfer and the substantial absence of refractory bonds also allows the improved fuel solids to be consumed at lower temperatures, thereby avoiding, for instance, undesirable thermal formation of nitrogen oxide compounds from atmospheric dinitrogen.

The ambiphilic nature of fuel particles provided by the invention method is attributed to the clean breakage of the fuel solid such that both hydrophilic coal surfaces and hydrophobic oils and tars in exposed pores are presented at the external surfaces of the comminuted particles. Use of hydration layers breaks up aggregates and aids in suspension. Thus for materials such as coal or resinous wood substances such as pine, the external surfaces of comminuted particles obtained from the invention process represent a combination of zones. Surface zones of hydration layers deposited directly on the wood or carbonaceous infrastructure of coal alternate with and are complemented by surface zones of unhydrated tar-like volatiles, thus both hydrophilic and oleophilic external surfaces are presented, resulting in the ambiphilic character. The characteristics of the surface and its hydration layers are also believed to be responsible for the improved adhesion of fuel solids to catalysts, absorbents, and other coating compositions. However the invention is not limited by the molecular origin of the hydration layers' properties. Hydration layers also hinder the adsorption of oxygen to fuel surfaces, and thus slow the chemical oxidative degradation of such surfaces.

Ordinarily surfactants must be used to obtain this level of affinity between solid fuel surfaces and liquid media. The ambiphilic surfaces and their hydration layers' affinity for liquid media enables the omission of surfactants in solutions, which represents a significant advance. Not only do surfactants represent an extra materials cost in fuel use, but in many cases they bind to the active sites on fuel surfaces, thereby impeding combustion and catalytic activity. It is believed here that the omission of surfactants is an additional reason that the fuels of the invention are particularly effective.

As an added benefit, suspensions obtained through the invention have proved to be particularly beneficial in high velocity flow applications because they cause little or no wear on nozzles or other parts. This tribological property is believed to have its origins in a synergistic combination of the small particle size and in lubrication effects by the solvation layers on the particle surfaces, with the result that the particles cause much less turbulence in fluid dynamics, as well as much less friction. The salvation layers are believed to be substantially or entirely comprised of water molecules, and to form during the organization or quasi-organization of liquid media about the particles when the suspension is created.

Thus a series of complex interrelated working hypotheses about the chemical and physical mechanisms have rationalized the discoveries and guided the invention disclosed herein. Nevertheless the metes and bounds of the invention are not defined by the theory.

Comminution Apparatus

It has been found that for purposes of this invention comminution of fuel solids proceeds most effectively at high speeds and when the presence of molecular dioxygen is reduced or substantially excluded. It has further been found that protection of the comminuted particles against dioxygen is beneficial at least to the point where hydration layers are formed, and even up to the point of the end use for the powder. The present invention provides improved steam-driven jet mills and an improved jet milling processes. Prior steam-driven jet mills are disclosed in a series of turbine patents to Taylor et al., see U.S. Pat. Nos. 3,978,657; 4,164,124; 4,288,231; 4,394,132; and 4,412,839, the contents of which are incorporated herein by reference. Also known as fluid energy attrition mills (FEAMs), jet mills in the prior art have routinely processed as much as 20 tons of coal per hour, with feed coal containing 6% to 30% or more water and 10-20% ash. Typically these operations have been used to produce coal materials with a top particle size of about 40 microns and an average particle size of 20 to 25 microns; usually no minimum particle size is specified. Older designs of jet mills relied intentionally or incidentally on collision between the particles and mill housing, resulting in extreme wear. Examples include models from Micro Energy Systems and Fluid Energy Products. By contrast, FEAMs use the shear field to grind the coal, thereby avoiding wear on the housing.

Fluid energy attrition mills as a class provide a shear field between a slow-velocity outer zone of gaseous medium and rapid-velocity inner zone of gaseous medium. The gas can be any gas, but the properties and cost of steam make it particularly useful for these mills. The spiral flow of gas for the shear field is obtained by directing a series of nozzles at angles relative to one another; a housing keeps the steam flow cyclical so that the momentum is not dissipated by centrifugal flow. Vortex shedding from the shear field rotates particles cyclically out of and back into the shear field where they are fractured by collisions, thermal cycles, and steam impact. The larger particles drop back into the grinding field and are re-mixed with the grinding steam. The shear field grinds the coal, whereas the vortexes classify the coal; micronized particles are carried upward away from the (typically) horizontal grinding field and vented with the steam. Typically but not necessarily the nozzles are located in a coplanar fashion just above the base of a vertically oriented mill. Typically but not necessarily the nozzles are located at regular intervals about a circle. Spray from the nozzles is typically but not necessarily directed somewhat upward from the base, e.g., about 12.5 degrees, and somewhat askew from the respective directions of spray of the next nozzle and previous nozzle in the circular series. The upward component of the nozzle angle determines the number of rotations per vertical unit distance in the upward spiral of steam. In one embodiment the spray defines a cone with about a 25-degree angle between the opposite edges of the cone as measured from the nozzle. Vortices are shed when the high velocity of the ejected steam from the nozzle intercepts the recirculation stream at the perimeter of the reaction vessel's interior, which is relatively quiescent. Thus in that embodiment a 12.5-degree angle of skew from one nozzle's direction to the direction of the next nozzle is particularly beneficial, though skew angles can differ by 10 degrees or more from that relative orientation. The skew angle is important regarding angling into the quiescent stream, and for imposing uniform rotational flow.

Angles that differ by more than 2 or 3 degrees from the ideal 12.5-degrees are often complemented by baffle or plug mechanical features in order to bring the aerodynamic flow closer to ideal, otherwise it can lead in some cases to "burping" of fines when they reach a critical mass. The skew angles from the coplanar base and from the radius do not need to be identical. In one embodiment the skew angles relative to the base and or the other nozzles are between 2.5 and 22.5 degrees. In another embodiment they are between 7.5 and 17.5 degrees. In another they are between 9.5 and 15.5 degrees. In still another they are between 10.5 and 14.5 degrees. In still another they are between 11 and 14 degrees. In a further embodiment they are between 12 and 13 degrees. In another embodiment they are approximately 12.5 degrees. A small gain in efficiency can be achieved if the nozzles are arranged such that the circular flow of steam that they provide is consistent with the direction of Coriolis force, i.e., counterclockwise in the northern hemisphere, and clockwise in the southern hemisphere.

In order to achieve rapid comminution, the steam velocity at the nozzle needs to be high. Sonic velocities are the highest practical velocities; above that point shock waves dissipate the energy without contributing to laminar flow and slow the speed to the sonic or subsonic level, thus the supersonic margin of energy is wasted. In air sonic velocity is ca. 1130 ft/s, however in steam the sonic velocity is ca. 2014 ft/s, thus steam provides a particularly effective shear field and vortex medium for achieving rapid grinding. The velocities are achieved by decompression of pressurized steam; the steam expansion ratio determines the velocity. Where a steam nozzle provides an expansion ratio of ca. 1.818:1 (i.e., the reciprocal of 0.55) in the throat of the nozzle, sonic velocity is achieved. However useful grinding velocities can be achieved with lower expansion ratios, for instance, at 1.5:1, which provides a steam speed of about 1340 ft/s. Subsonic velocities result in lower shear and vortex speeds, less flow energy, faster energy dissipation in the shear field and vortexes, thereby reducing the grinding capacity, and providing less efficient classification of the particles. Thus in one embodiment the gas injection velocity is 0.5 to 1.0 times sonic velocity, and in another embodiment 1.0× sonic velocity is used. Sonic speed is a function of the square root of the molecular mass of the gas used; by way of comparison, water in steam has a molecular mass of ca. 18, dinitrogen gas has a molecular mass of ca. 28, carbon dioxide gas has a molecular mass of ca. 44. Based on the square root relationship the sonic velocity of carbon dioxide will be just over 50% higher than for steam.

The axial length of the milling chamber is also a factor in the comminution specifications, because particles require a critical number and kinetic energy of impacts with each other in order to reach the targeted small sizes. In one embodiment the length of the reaction chamber—and thus the axial length of the shear field and steam vortexes for classification—is selected empirically. In another embodiment the length is selected to allow particles to travel for an average of at least 10 revolutions or at least 10 seconds before exiting the chamber.

Illustrative production-scale mills of this type may employ 60 nozzles in a housing diameter of 5 feet, and a housing length of 1-12 feet, and comminute 40,000 lbs. of ¼"×0 nuggets of coal per hour to a maximum diameter of 40 microns. Smaller mills of the Stephanoff type (i.e., with collision against the mill housing) have existed, with maximum capacity of 2 tons per hour, however they suffer from severe wear and cannot be scaled up. Smaller mills of the Taylor type (i.e., FEAMs) have not been used or considered feasible in the prior art, however the present invention includes smaller mills, for instance using 6 nozzles in a housing diameter of 24", height of 36", and grinding 300-600 lbs. of coal per hour with specifications otherwise similar to those of the larger mills, though steam requirements and nozzle diameters change with capacity. Exemplary dimensions for the smaller mills include nozzles with a 9/64" orifice, and a 32-inch vertical height for the mill. The figure of merit for the flow rate versus the vessel size is determined empirically. The prior work by Stephanoff employed a toroidal configuration, processing 2 tons of coal per hour, and suffered from wear problems where 500 lbs./hr steam eroded the walls of the vessel where they were within 60 inches of the steam injection jet. The efficiency of fluid energy attrition mills that avoid particle collisions against walls is a function of the amount of vortex shedding. The intensity of the vortex determines the classification—i.e., the sorting by size—of the coal particles. Higher vortex intensities enable smaller particles to be produced.

The most convenient milling medium in many circumstances is steam, thus the exemplary embodiments below describe use with steam, however other milling media can be employed using specification adaptations that will be apparent to persons of ordinary skill in the art. In one embodiment the alternative medium is carbon dioxide, wherein after the coal is milled in a medium comprising carbon dioxide moisture is added as necessary to achieve the desired levels of hydration. Carbon dioxide is also an attractive medium because it can be harvested from ordinary air and stored until needed; from such a source releasing it back to the atmosphere causes no net change in the environmental carbon fingerprint of the milling facility.

As for the embodiments that use steam as the milling medium, the steam is superheated. In a representative embodiment the steam is provided at the source from a boiler that provides 750° F. (400° C.) super-heated steam at 200 to 650 psi. Upon expansion to ambient pressure when leaving the nozzle at the bottom of the drum (i.e., at the bottom inside the comminution chamber), and also due to contact with the lower temperature fuel solids, the steam temperatures typically fall to 225° F. (110° C.) in the chamber, still superheated but less so, and now usually at approximately atmospheric pressure. At a two-fold expansion the steam is injected at sonic velocity; the internal velocity of the mill is then proportional to the drum size.

The mill may employ a single-walled design, such that the same layer of metal that constrains the shear field and vortexes also serves as an exterior wall of the mill. Or the mill may have more than one wall, such that there is an internal wall defining the reaction chamber and constraining the steam, and a separate external wall.

The fuel solids are entrained in the steam. A particularly convenient approach is to begin with nuggets that are ⅛"×0 to ½"×0 in size; for fuels such as coal this is not an unusual specification. However, the mill can also comminute nuggets with diameters as high as 3 to 4 inches; this depends in part upon the density of the solids. Because the particles are different sizes they move with different velocities and directions and collide en route. As the nuggets are ground, the centrifugal force on the pieces becomes less due to their decreasing mass, and the micronized particles migrate to the center and top of the chamber, from which the steam is vented by an output feature. The micronized particles are collected from the vented steam either by drying or by passing the spent steam through a scrubbing unit which scrubs the steam in a liquid medium to capture the particles in a suspension or conveyed in the entraining steam to a boiler. The output feature may also or alternatively be in line with a gasifier unit or a liquefier unit.

Fuel solids can be entrained in the steam by any of several means which are familiar to persons of ordinary skill in the art. For instance, in batch processing the entire amount of fuel solids can be present in the mill and introduced by gravity feed from a hopper into steam near the onset of the shear field. However it is generally more useful to have a continuous feed of fuel solids into the mill, for instance with a screw feeder introducing fuel solids from the outside to the inside of the grinding chamber. By using an optional steam jacket about the screw feeder, oxygen can be excluded more completely and the fuel solids can be injected into the mill with more force.

In the prior art, jet mills used for coal with superheated steam have imparted enough heat to the comminuted coal to drive evaporation to completion when the steam was vented; the resulting particles were then used in an essentially anhydrous state for combustion, and without protection from oxygen. However it has now been discovered that the presence of a hydration layer substantially improves the fuel particles, particularly where oxygen has been excluded. Mills adapted for this purpose control the steam conditions so that a small amount of water remains present to hydrate the comminuted fuel surfaces; several illustrative embodiments demonstrate this. About 0.25% to about 5.0% water by weight relative to the fuel solids is generally adequate for creating a hydration layer. The precise extent of hydration in the resulting fuel will depend on several factors including the design of the mill, but some illustrative values are provided here.

In one embodiment the mill has a governor that caps or raises the steam temperature and or its rate of injection into the reactor. The governor is set at a level that leaves the steam-entrained fuel solids with a level of heat to enable evaporation of water from the fuel to a desired level upon venting from the reactor or during the scrubbing step. For example, for 30,000 pounds of steam containing 40,000 pounds of fuel, the steam is provided at about 750° F. (400° C.) at the point of injection, falling to about 300° F. (150° C.) due to heat dissipation during particle comminution. The typical ten-second dwell time of coal in the mill during processing represents an estimated 111 pounds of fuel and 83 pounds of steam. After venting the steam-entrained fuel solids the weight percent of water remaining in the particles after evaporation of the steam depends on the fuel's initial water weight. For instance, superheated 750° F. steam at 200 psi at the source can provide enough heat to evaporate coal with up to about 12% initial moisture to bone dryness, can remove all but about 2.5% moisture from coal containing 15% moisture initially, and for the next several increments of humidity leaves 5% of moisture in the final coal for each additional 4% of moisture it contains initially, by weight. The reason for the falling ability to dry coal is that larger quantities of energy from the superheated steam are lost when heating the moisture of very wet fuel to the 300° F. temperature inside the mill before venting. Lower steam temperatures have correspondingly lower capacity to dry the coal, thus under otherwise analogous conditions, steam that has 650° F. (ca. 345° C.) and 200 psi at the source provides enough heat to evaporate coal with no more than about 9% initial moisture to bone dryness.

In another embodiment a cool-water spraying unit is placed inside the reaction chamber near the vent. The cool water is provided in sufficient quantities and with a low enough temperature to reduce the heat content of the exiting steam below the point where it will evaporate to leave comminuted fuels anhydrous. The heat capacity of water and thus its cooling effect are calculable for any desired level of cooling. In yet another embodiment cool water is provided by a misting unit just outside the steam vent to cool the exiting steam.

In locales where water resources are particularly limited or costly, the steam can be recaptured by condensation after milling, and any water removed from the coal before milling can also be recycled. Because the water content in native coal may represent 30-40% by weight, mere use of the coal provides a constant source of new water as a resource. Coal varieties that are particularly high in moisture include lowsulfur subbituminous and lignite coals from North Dakota, Wyoming and Montana.

In another embodiment a steam spraying unit is placed inside the reaction chamber near the vent. The steam or superheated steam is provided in sufficient quantities and with a high enough temperature to increase the heat content of the exiting steam below the point where it will evaporate to a desired dehydration level for the comminuted fuel. In a further embodiment steam or super-heated steam is provided by a spraying unit just outside the steam vent to heat the exiting steam or after initial evaporation, the comminuted fuel.

In another embodiment a steam jacket or super-heated steam jacket is combined with a screw feeder for fuel entering the processor. The steam is provided in sufficient quantities and with a high enough temperature to in order to evaporate initial water in the fuel to a desired level prior to comminution.

In still another embodiment, the mill is in line with an evaporation unit from which steam is allowed to evaporate from the issuing flow from the mill in the absence of dioxygen, and where the anhydrous or mostly dry fuel is rehydrated. The rehydration may for instance be carried out by a misting unit, a steaming unit, or a sub-saturation humidifying unit. The rehydration may also be conducted by adding moisture to a fuel solids-in-oil suspension, for instance adding 2.5% water by weight of fuel solids in the suspension.

Optional but desirable features in the mill include means for introducing within the chamber a secondary substance such as a grinding aid, catalyst, catalyst precursor, absorbent, hydrogen donating substance or other reducing agent, or other substance. In some cases the secondary substance is most conveniently introduced by adding it to or mixing it in solid form with nuggets of fuel, or by spraying the nuggets with a solution or suspension containing the secondary substance. In other cases the secondary substance is most easily introduced by means of an ancillary feeding device, such as a hopper, screw feeder, or by injecting it through the nozzles along with the steam jets that form the shear field and vortexes. Optionally, in addition to an inlet for steam or another driving gas the mill has also or in the alternative an inlet for a secondary substance which is an added gas such as natural gas, hydrogen gas, carbon monoxide, carbon dioxide, methane, syngas, steam, or another gas or gaseous mixture.

The internal surfaces of the reaction chamber must be able to withstand the temperatures generated by the presence of superheated steam in the absence of oxygen. For these typically nickel steel, carbon steel and refractory ceramics are adequate, particularly since the fluid energy attrition mill design avoids wear by the fuel solids on the mechanical parts. Essentially all of the grinding is conducted in the steam shear field. Higher temperatures can be accommodated in the reaction chamber as necessary, for instance where a fuel surface is being coated with or reacted with a reducing agent or catalytic substance. Thus thermally insulating features such as mantles, thermal blankets, inserts, refractory tiles and the like can be used to protect the interior surface of the wall of the reaction chamber to 1200° F. (650° C.), 1600° F. (870° C.), or higher. For reactions in which no more than several atmospheres of pressure are being applied, a steel-walled or ceramic-walled reaction chamber often will need no additional protection. It is noted here that corrosive substances such as caustic compounds may not be compatible with a particular ceramic, and that alumina, silica and titania compositions are susceptible to degradation by gasification catalysts in particular. Thus metal or other non-reactive coatings on these ceramics are necessary if they will be exposed to corrosive compounds.

Comminution Process

Using an apparatus such as the one disclosed above, or using an apparatus that performs similar functions, fuel particles can be comminuted and provided with hydration layers. The fuel solids may be of any type; examples include coal varieties such as lignite, bituminous, subbitumionous, anthracite and peat, as well as other carbonaceous materials such as cokes, including petroleum cokes, and biomass. When anthracite is used, the milling process or a subsequent step must include extra capacity to hydrogenate the material because of the low hydrogen content in the coal Alternatively or in addition the fuel solids may include biomass such as peat (which is both coal-like and biomass-like), sawdust, wood, pulp, paper, straw, lignin, chaff, bagasse, agricultural waste, forest waste, yard waste, mulch, microbial biomass, fishery waste, feathers, fur, hoofs, manure, and so forth. Alternatively or in addition the fuel may be petroleum coke.

Also alternatively or in addition the fuel solids may include synthetic polymers including but not limited to polyolefins such as low- and high-density polyethylene, polypropylene, and polybutylene; vinyl polymers such as acrylic and methacrylic polymers and polystyrene and polyvinylchloride; rubbers such as natural and synthetic polyisoprene rubbers and latexes, as well as acrylonitrile-butadiene-styrene (ABS polymers), alkyl silicones and other synthetic rubbers; ring-opened polymers such as polyalkylene oxides; epoxides; condensation polymers such as polyethers, polyetheresters, polyamides such as nylons, and polyesters including phthalate polymers such as poly(ethyleneterephthalate); and other synthetic polymers such as are known to persons of ordinary skill in the polymer arts.

Particularly where the fuel is soft or fibrous such as peat or plant fiber, or where the fuel is molten at the working temperatures of the invention process conditions, it can be useful though not absolutely necessary when grinding to include a hard grit or a hard fuel material that is not molten under the process conditions. Ordinarily mills will not grind soft, fibrous or molten materials, and yet such materials can be excellent fuels especially after comminution. Thus the current invention is not limited to hard fuels.

Fuel solids are provided usually ⅛"×0 to ½"×0 in maximum diameter in one embodiment, however they can be up to 3 inches in another embodiment, provided that the solids are ground for a sufficient period of time and at a sufficient level of energy to reach the targeted degree of micronization. Typically any fuel solid that has already been partially comminuted by a hammer mill is satisfactory as a starting material. Pieces of petroleum coke used in the mill can be larger than those of most other types of fuel because it is a friable material, e.g. 5 inches or more in widest diameter is viable if the supply mechanism for the mill can handle pieces that size.

A useful size range for starting material in grinding coal is ⅛" to ½"×0 mesh size, and ¼"×0 mesh size is particularly useful, however the invention is not so limited. Typically larger pieces of coal are crushed, as in a hammer mill, and then screened on a grate to reach that particle size. The small coal can be fed through a surge hopper and injected into an aerodynamic grinder with one or more jets of super-heated steam to provide an approximately 1:1 mixture of coal and steam by weight in a largely oxygen-free environment inside the grinder. The aerodynamic grinder referred to here is also known as a fluid energy attrition mill, and is an economical device to process large tonnage rates of material throughput.

The output is a stream of $\leq 40$ micron diameter coal particles whose particle sizes tend to conform to a bell-shaped distribution curve, e.g., 10-40 microns in size though the maximum diameter can be smaller by allowing the particles to be ground for longer times they can be made smaller still. An advantage of comminuting to smaller final particles for materials such as coal is that a larger proportion of heteroatom impurities are exposed. This facilitates beneficiation, thus oxygen, nitrogen and sulfur moieties can be removed more efficiently if, for instance, carbon monoxide is included in the steam during milling. One further advantage of the method is that the particles are very porous, with channels running through them created in part by steam explosion of sealed pores. And aerodynamic grinding is believed to be the method most likely to result in spherical particles, which have lower friction in suspension than non-spherical particles. By contrast, it has long been recognized that mechanical milling closes porosity by a combination of crushing the channels, agglomerating larger particles, and clogging pores in large particles with small particles.

Another advantage of the method is that it can minimize the presence of air during grinding. Academic literature has reported grinding under water or in an inert atmosphere to keep air out. Here, injection of the steam can be used to drive out any air in the grinding chamber before the coal is added, and also to drive out adventitious air from the coal before it is provided through a feeder such as a surge hopper. The prior art made no special provisions to exclude the air from production grinders; in fact, prior workers deliberately injected air into their production-scale grinders. The primary factors in grinding include the amount of moisture in the coal, the beginning size of the coal particles, the final desired size of the coal, the absence of air, and the aerodynamics of the flow field. The fluid energy attrition mill of the invention typically employs ratios of 0.75:1 to 1.25:1 for the steam:coal ratio by mass. Moisture already present in the coal affects the heating rate of the particles, the amount of steam necessary to heat the coal, and is believed to produce a "popcorn" effect as it rapidly reaches its boiling point within coal pores. The initial coal particle size is important because larger pieces need more steam to drive them around the shear field of the processor and to achieve an equilibrium at a desired temperature range within the coal particle itself. The desired final coal size also affects the choice of parameters, because achieving finer grinding requires extra circuits within the processor and thus extra steam. Typically a maximum particle size of 40 microns is provided by about 10 circuits within the shear field of the fluid attrition mill.

It is useful but not absolutely necessary to de-aerate the fuel solids before milling them by the invention method. The de-aeration can be done by treating them with essentially pure steam and or a gas such as carbon dioxide or carbon monoxide prior to adding the solids to the reaction chamber.

In one embodiment, steam is provided at a temperature of at least 350° F. and atmospheric pressure. In another embodiment the steam is provided at 400° F. or more. In a further embodiment the steam is provided at a temperature of at least 500° F. In yet another embodiment the steam is provided at a temperature of at least 650° F. In a further embodiment the steam is provided at a temperature of 650-750° F. and 200 psi pressure.

The rate of steam flow through a nozzle may be calculated in pounds per second as 51.43× throat area of nozzle (in square inches)×manifold pressure (in pounds per square inch). The critical (i.e., sonic) velocity is reached when the pressure on the steam exit side of the nozzle is 55% of the pressure on the steam entry side of the nozzle, e.g., when the pressure is 100 psi on the entry side and 55 psi on the exit side. And for instance sonic velocity in steam is reached when the enthalpy change falls from about 1380 to about 1300 BTU/lb of steam. After exiting the throat the steam will expand further to the pressure in mill, about 20 psi when it is operated at atmospheric pressure, at which point enthalpy is 1207. 1300–1207=93 BTU/lb steam contributed to the grinding field, leaving 60 BTU/lb. in the steam before condensation; that 60 BTU/lb. is available to evaporate excess moisture. The entire enthalpy is thus 1380−1207=173 BTU/lb. which will evaporate native moisture from the coal or other fuel and heat it to the equilibrium temperature in the mill. The exit temperature for a processor handling 20 tons per hour is typically 200-300° F., depending on the moisture of the fuel solids at the outset. The square root of the steam's number of BTU/lb. is multiplied by 223.8 ft/s to calculate the velocity of the steam through a nozzle with a 1.818 decompression ratio when the source steam has been held at 200 psi. Examples 1, 2 and 3 and FIGS. 1, 2 and 3 provide additional illustrative calculations for the steam-driven drying of coal.

A velocity within 5% of 1340 ft/s is on the low end of what is effective; about 2014 ft/s is the optimum velocity in terms of energy efficiency, being the sonic velocity of dry steam. In one embodiment the steam is provided at a velocity within 5% of 2014 ft/s; in another embodiment the steam is provided at a velocity within 10% of 2014 ft/s. In a further embodiment the steam is provided at a velocity within 20% of 2014 ft/s. In still another embodiment the steam is provided at a velocity within 30% of 2014 ft/s. In another embodiment the steam is provided at a velocity within 35% of 2014 ft/s. Note that sonic velocity in steam differs from sonic speed in many other media: In dry air at a temperature of 70° F. (21° C.) the speed of sound is 1130 ft/s (344 m/s, 1230 km/h, or 770 mph).

The steam is directed from a plurality of nozzles to form a shear field in a reaction chamber; the fuel nuggets are simultaneously or subsequently entrained within the field and comminuted until the maximum particle size is 40 microns or less. Distributions with 20- or 30-micron maximum particle sizes are also convenient. Distributions with maximum particle sizes as low as 10 microns are feasible. The comminuted distributions have some polydispersity in size, i.e., they have a distribution of particle sizes with a statistical maximum at about the mean particle size, however the particle size distributions can be much narrower than those of other FEAM or normal grinding methods. There is, however, no requirement that the fuel solid nuggets be polydisperse in size. There are also no chemical composition limitations on the input particles.

The steam provides a quiescent field outside the nozzle injection range, and a shear field and vortex shedding at the boundary between the quiescent and direct jet stream. The shear field is where most of the comminution of particles takes place. In one size reduction mechanism, the larger particles are believed to have more inertia and thus have less acceleration; thus the smaller particles accelerate more rapidly and essentially erode the larger particles upon impingement. In another size reduction mechanism, steam pressure is thought to erode the particles. In a third size reduction mechanism, a "popcorn" effect is thought to explode coal and other water-containing fuel particles when their internal water reaches the boiling point. In any case the larger particles migrate to the outside of the centrifugal field, and the smaller particles migrate to the interior of the centrifugal field and are collected there. The final particles are compared to popcorn (i.e., porous compared to the starting material) as opposed to the "corn flake"-like coal particles (densified compared to the starting material) obtained from ball mills and other mechanical milling devices.

Some observations about the fluid attrition mill merit consideration. First, steam pressure can be reduced to control shearing properties. Also, only available superheat can be used to dry the coal. Superheat is the excess of heat above the boiling point of water, which is 212° F. at ambient pressure; for instance steam at 250° F. represents only about 38° F. of superheat. The super-heated steam which entered the drum at 650° F., exchanges heat and momentum with the coal and its water inclusions, and retains only about 250° F. worth of superheat energy for drying the comminuted fuel. 60 nozzles grind about 20 tons of ¼"×0 mesh size coal per hour. In an exemplary embodiment, one-quarter-inch nozzles produce about 500 pounds of steam per hour; using 3/16" nozzles cuts that steam velocity by about 50%. Supplying 400 pounds of steam pressure from the boiler instead of 700 pounds also cuts the steam flow rate by about 50%. Patents pertaining to the fluid attrition mill addressed its use for producing boiler fuel; see the aforementioned patents to Taylor et al.

Fuel solids with 0.05 to 5.0 weight % or more water are attained by the means discussed in the previous section—i.e., by evaporating the steam to that degree of hydration, or by cooling the superheated steam before evaporating it from the particles, or indirectly by completely drying the particles followed by a humidification step.

Secondary Substances

In some embodiments it is useful to introduce secondary substances to fuel solids before or during their comminution in the mill. Illustrative examples of secondary substances include grinding aids, catalysts, catalyst precursors, absorbents, and reducing agents, among other substances. Secondary substances include gases, such as natural gas, hydrogen gas, carbon monoxide, carbon dioxide, syngas, methane, steam, and other gases and gaseous mixtures. These can be added to the fuel solids themselves, for instance while they are in a hopper or screw before entering the mill. Or the secondary substances can be introduced as dissolved compounds or as inclusions in the steam injections. Or the substances can be introduced to the mill by a port that is distinct from and complements the steam nozzles and the fuel solids feed mechanism. The choice of introduction method will depend on the properties and desired use of the secondary substance. For instance, it is convenient to add grits as grinding aids to the fuel solids before they enter the mill. And it is convenient to provide water-soluble catalysts or their precursors or absorbents in the steam jets. Where the secondary substance is a gas, it is convenient to add it at practically any point: as a mixture with the steam, as a separately injected substance in the reaction chamber, or with the fuel solids before or during entry to the mill. The choice of method of introduction of reducing agents will depend upon the physical properties of the preferred agent(s). A common reducing agent, tetralin, melts at −33° F. and boils at 403-406° F., thus it may be injected as a gas in superheated steam, may be added as a liquid to fuel solids before their introduction to the reaction chamber, or may be added as a liquid to the chamber.

Grinding aids are particularly useful when the fuel solids include soft or fibrous or molten materials. Many if not most types of biomass are examples of soft or fibrous materials. Examples of grinding aids include sand, silica, alumina, metallic or carborundum grit, small coal solids, and the like. It is useful to have grinding aids present in an amount no less than 0.1% to 10% by weight of the soft or fibrous or molten material. It may be beneficial to employ a grinding aid that has a significantly different density or solubility from the soft or fibrous or molten material so that the grinding aid can be recovered in a subsequent step, for instance in a separation from ash or from a scrubbed solution.

The benefit of adding a catalyst or its precursor to the mill is that it can be made to cover exterior and interior surfaces of the ground particles in a fine and thorough way. Thermal cycling is thought to provide a differential pressure change effect that assists in "pumping" catalysts to the interior surfaces, though this will be more effective at smaller sizes and favorable flow shapes for catalytic particles. The resulting fine distribution of catalyst provides improved kinetics and expedites conversion when the comminuted fuel solids are subsequently raised to the critical temperatures and pressures required for catalysis. In the present invention at least four types of catalysts are particularly useful for inclusion during comminution in the mill: gasification catalysts, liquefaction catalysts, combustion catalysts, and cracking catalysts. By contrast, prior art users have sprayed catalysts into scrubbers. In one embodiment the weight percent of catalyst added relative to the fuel solids is 0.05 to 50 wt. %, in another embodiment it is 0.5 to 25 wt. %, in a further embodiment it is 1 to 20 wt. %. In another embodiment it is 2.5 to 15 wt %, in still another embodiment it is 5 to 10 wt. %. Catalysts, catalyst precursors and absorbents are found as minor components in fuel solids from several natural sources, notably including coal. Thus they may be present to a modest extent even if not added; the ranges above do not include catalytic or catalytic precursor concentration ranges found in pristine native fuel solids.

Gasification typically employs alkali or alkaline earth compounds as catalysts; often these are carbonates; they reduce the conversion temperature and speed up the conversion but they do not alter the product slate. An example of a gasification catalyst, which serves as a catalyst for gasification and which can also scavenge sulfur oxide compounds during comminution, is calcium carbonate. Calcium carbonate decomposes at about 1710° F., thus it is stable at the contemplated gasification temperatures for the invention method but would decompose at the temperatures in widespread use today. Potassium carbonate is another example of a gasification catalyst useful in the present invention. Catalyst precursors can likewise be used instead of or in addition to the catalysts. An example of a catalyst precursor for gasification is calcium oxide (CaO, also known as lime), which upon exposure to carbon dioxide reacts to form $CaCO_3$.

Acidic gasification catalysts can also be used. These include alumina and silica, and can be used in conjunction with ceramic refractory materials in mills. Mineral acid such as hydrochloric can also be used, though refractory insulating materials may be less stable toward that.

Liquefaction catalysts by contrast are typically sulfides of transition metals; particularly useful catalysts are sulfides of tungsten, molybdenum, iron, cobalt, nickel, and combinations thereof in complexes. The liquefaction catalysts circumvent the need for a donor solvent during conversion; instead crude oil or residual refinery oils that would otherwise require coking can be used as a hydrogen donor. An example of a catalyst precursor for liquefaction is metallic iron, which forms iron sulfide upon reaction with sulfur moieties in fuels. Additional exemplary catalyst precursors include soluble metal salts such as molybdenum ammoniate compounds and ferrous or ferric chloride compounds; for instance these can be used to wet coal or another fuel solid during or prior to comminution. Optionally after coating and or comminution a small amount of hydrogen sulfide can convert these compositions to insoluble catalysts.

Optionally, combustion catalysts may be introduced to the solid fuel feed, to the mill, or to a fuel composition in a process step subsequent to the mill. These catalysts serve one or more of three purposes: reducing nitrogen oxides to dinitrogen and dioxygen ($2NO_x \rightarrow xO_2+N_2$); oxidizing carbon monoxide to carbon dioxide ($2CO+O_2 \rightarrow 2CO_2$), and oxidizing unburned hydrocarbons to carbon dioxide and water ($2C_xH_y+(2x+y/2)O_2 \rightarrow 2xCO_2+yH_2O$). The most active combustion catalyst is platinum, however the cost and the potential for unwanted side reactions make it non-optimal for some uses. Two other precious metals that can serve as combustion catalysts are palladium and rhodium. Platinum and rhodium are used as a reduction catalyst, while platinum and palladium are used as an oxidization catalyst. Cerium, iron, manganese and nickel are also combustion catalysts; because of nickel's proclivity for dioxin formation, emissions from nickel-catalyzed combustion may require specific containment measures. Catalyst precursors for any of these metals, if used, are not zero-valent metals but metal compounds that decompose to yield the zero-valent metal. Combustion catalysts tend to be poisoned by sulfur, and by metals such as lead. When beneficiation is conducted in the mill for high-sulfur fuel solids such as Illinois coal, in one embodiment a combustion catalyst is not added until a process step after comminution such as in a scrubbing step. The added catalyst may optionally be presented on a support material such as silica or alumina, which may optionally be further undergirded by a foundation of another material.

Another type of secondary substance is absorbents. Exemplary absorbents include oxides of alkali metals or alkaline earth metals or of manganese. An example of an absorbent is CaO, which upon reaction with carbon dioxide forms the compound $CaCO_3$. As noted above the carbonate decomposes into CaO and $CO_2$ just above 1700° F.; the carbonate also decomposes in the presence of acid; thus carbon dioxide can be sequestered by lime and then recovered. Examples of useful absorbents are oxides of alkali metals and oxides of alkaline earth metals. Thus in many cases absorbents are catalyst precursors for gasification. Another exemplary absorbent is carbon monoxide, which is useful in the invention to react with and hence extract heteroatoms from the fuel. In one embodiment the weight percent of absorbent used relative to the fuel solids is 0.05 to 50 wt. %, in another embodiment it is 0.5 to 25 wt. %, in a further embodiment it is 1 to 20 wt. %. In another embodiment it is 2.5 to 15 wt %, in still another embodiment it is 5 to 10 wt. %. The ranges above do not include sorbent concentration ranges found in pristine native fuel solids.

For added suspendability surfactants may be added to the fuel solids or the mill as for the catalysts and other compositions noted above. Depending upon the surfactant these are typically useful in the range 3-5 weight percent relative to the fuel solids, though in some cases as little as 50 ppm might be used. Ethoxylated hydrocarbons such as those in a series provided by Rohm & Haas are among the more important surfactants in the United States for coal slurries. However the improved fuel solids provided by the present method have intrinsic surfactant-like properties, thus the inclusion of surfactant is optional and may in fact merely increase the cost and hinder the efficiency of combustion or conversion.

Recovery of Solids

Following comminution the solids are conveniently recovered by one of two methods. The first method is evaporation as the leading edge of the steam envelope is vented in a gaseous atmosphere such as air, dinitrogen, or carbon dioxide. Carbon dioxide is particularly useful when the objective is to protect the solids from aerobic oxidation, because $CO_2$ is a byproduct of fuel use, and is heavier than air. The solids can be rehydrated by providing a light mist or humid gaseous environment such as moist air or another moist gas. The objective is to obtain fuel solids that contain about 0.5 to 5.0 or more weight percent of water relative to the fuel portion. In a particular embodiment the weight percent of water in the fuel is between 0.05 and 7.0.

Alternatively the solids can be recovered by scrubbing steam from the leading edge of the steam envelope such that it is blown into or through a liquid medium such as water, oil or an oil-and-water mixture. The proportion of moisture and ash can vary widely in some fuels such as coal and biomass, thus the moisture- and ash-free (MAF) content of the fuel solids provides a useful reference for describing its prevalence in a suspension; because ash is denser than carbonaceous material the moisture-free basis alone may be sufficient for designating the solids content of a suspension. Typically 35-40% solids (calculated as if for their moisture-free state) represents the maximum workable solids content for a suspension; beyond that level the suspensions become thixotropic, and at 50% MAF solids they are often non-flowable. Suspensions having over 50% liquid medium by weight are particularly useful. In another embodiment the suspension comprises about 70% liquid medium by weight. Note that a more polydisperse particle size distribution enables higher loadings in suspensions; such distributions can be obtained for example from one mill run with a broad range of particle sizes, or by combining a plurality of less polydisperse runs where each has a different mean. Particularly useful liquid media include water, no. 6 fuel oil, recycle oil, and mixtures of one or both of those oils with any ratio of water to oil by weight. The oils can serve as donor solvents for hydrogen transfer, but optionally another reducing agent such as tetralin may be added to the liquid media or the suspensions to obtain; donor solvent(s) can represent 35% to 100% of the liquid phase.

Semi-Dehydration and Rehydration

The enthalpy proportional to the drying capacity of coal is relatively small. At 600 psi and 700° F., the enthalpy is 1450 BTU/lb. of steam. At 20 psi and 250° F., the enthalpy of steam at the exhaust port is 1167 BTU/lb, leaving a difference of 283 BTU per pound of steam available for drying. Evaporating water requires 1100 BTU/lb., i.e., 3.89 pounds of steam are required to evaporate 1 pound of water. Thus for 1650 pounds of steam, 424 pounds of water can be evaporated. At a 1:1 ratio of steam to coal by weight, coal that initially had 10% moisture would be collected as essentially anhydrous coal. However it is desirable to have a hydration layer on the coal, thus evaporation of only 90% of the steam would be more preferable. That can be attained either by misting with cool water at the outlet of the mill to wet the stream of collected coal, or by adjusting the steam input temperature and factoring in the initial water content of the coal being fed into the mill. Adjustment of the mill's initial steam conditions is particularly convenient for obtaining a uniform and well-equilibrated hydration layer.

The ranges for efficient grinding and hydration in the mill tend to be narrow. Coal with an initial moisture content above about 12% does not emerge bone dry from the attrition mill when the shear field steam is at 300° F. superheat and the coal is reduced to an upper diameter limit of 40 microns. For instance Mississippi lignite containing 30% water by weight and using 700° F. steam was rapidly reduced to micron-size coal; the resulting product was still quite wet but was size-reduced. Also, coal may appear to be dry when it still has a relatively high water content, especially in younger coals, such as lignite and sub-bituminous coals, that have a high proportion of functional groups containing oxygen atoms in their carbonaceous phases. Thus, for obtaining the desired hydration layers by engineering design, it can also be important to pre-dry coal that has a high water content. As necessary such moisture can be recaptured and reused to conserve water consumption by the plant.

Fuel Type

Fuel solids provided by the apparatus and process above have distinctive characteristics, as is illustrated herein for coal. Unlike solids obtained by traditional grinding, for comminuted coal obtained by the invention method the organic structure's density is typically no greater than the density of the organic structure of the initial coal nuggets. Also, the porosity of the coal when water is essentially absent and volatiles are factored out is not less than the porosity of corresponding structure in native coal, and tripling of the porosity has been observed in lignite samples from the mill. Likewise, the surface area of comminuted coal is no less than for the surface area of the corresponding structure in native coal nuggets, and because of the improved porosity typically exceeds the exponential increase of surface area that one might expect from mere breaking of the particles into smaller pieces. The speed and efficiency of coal combustion and chemical conversion are dependent upon the porosity, the ratio of surface area to volume, and the density of the coal, thus the improved physical properties have important benefits for leveraging the energy content of coal. Because the invention further provides for optional improved distribution of secondary substances, including in the interior pores of the solids to the extent they are accessible, a new type of fuel is obtained which has advantageous properties for either combustion or chemical conversion.

In the art, removal of water is typically accomplished by holding a coal sample at a temperature slightly above its boiling point, and this is generally done in air. Although volatiles can be removed at 600-700° F., for analytical purposes volatiles are typically removed by holding a coal sample at a temperature of about 1700° F. in the absence of air for a period of several minutes. To calculate pore volumes of the persistent carbonaceous infrastructure of the coal, it is useful to merely factor out the approximate amount of volatiles based on weight percentages that are typical for the coal and its mine source, and based on the approximate density of the volatiles (often ca. 1 g/cm$^3$). Porosity is often measured by the surface area in m$^2$/g determined by BET methods using a gas such as argon, nitrogen, helium or carbon dioxide.

The porosity and internal surface area of coal merit additional comments. Coal has a dendritic network of pores, not all originating at the exterior surface. The pore sizes decrease over the length of the branches, thus macropores (>50 nm) lead to mesopores (2-50 nm), which in turn lead to micropores (<2 nm). Micropores predominate in the more highly ranked coals, whereas macropores predominate in low-ranked coals such as lignite. The degree of porosity falls but the robustness of the pore structure increases with the degree of coalification. Thus bituminous coals have 1.5 to 7% internal water in the native state; this can be removed and replaced again almost in its entirety because the pore structure is stable. Sub-bituminous coals have up to 10% internal water in the native state, but only about half of that can be replaced after the material has been dried. Lignite coals have up to about 30% internal water in the native state, and only about a third of that can be replaced after the material has been dried. The reasons for lignite and sub-bituminous behaviors after drying by conventional heating in air at 220° F. or more are not completely understood: they may be due to irreversible collapse of channels destroying a gel-like character of the native undried state, and or they may be due to oxidative cross-linking or the flow of hot oils and molten coal tars, sealing pores when the material is heated in air. Coals typically have in the range of 10-200 m$^2$/g of (internal) surface area; this surface area tends to be at its lowest in the highly ranked coals and at its highest in the low-ranked coals such as lignite. Pore volume measurements are somewhat varied, and typically reflect only the volume occupied by the water in native coal as opposed to the so-called volatiles. But for example, Silbernagel reported finding 0.134 mL of pore volume per gram of dry coal; that represents about 12% of the coal by volume. See, Bernard G. Silbernagel, "Physical Characterization of Coal Surfaces," Chap. 1, in *Interfacial Phenomena in Coal Technology*, G. D. Botsaris and Yuli M. Glazman, eds., 1989, pp. 1-32, at p. 17.

It seems quite likely that the level of porosity that is measurable is affected by drying conditions for the coal. At elevated temperatures internal oils and or tars are likely to melt and flow, sealing or shrinking some access routes to pores. The mass percentage of high-boiling volatiles in coal is high: up to 8% in anthracite, up to 28% in bituminous coal, up to 45% in sub-bituminous coal, and up to 65% in lignite. Without being bound by theory, it is believed herein that effects from oil and or tar flow that would otherwise occur are prevented or compensated in the invention method. This is explained in part by steam explosion of sealed internal pores of fuel solids in the mill, and in part by the fact that rapid reorientation of particles in the mill favors no particular direction for tar flows, unlike slower grinding with mechanical crushing. Oxidative cross-linking is also minimized by the anaerobic conditions of the mill, thus minimizing shrinkage of pores in the carbonaceous infrastructure.

Due to the extensive fracturing and mixing in the mill, direct study is not feasible for porosity changes that occur when the parent nuggets are comminuted by the invention method. And due to expectation of steam explosion effects, it is believed that significant changes in the shape and size of specific pores occur during processing in the mill. Thus the retention of porosity is described indirectly herein using three metrics. The first metric is the density of the fixed carbonaceous infrastructure of the fuel when water and volatiles are factored out. The exact size and configuration of pores is irrelevant for density because only the total relative volume of pores is reflected. The second metric is internal surface area per gram, the surface area that remains when the exterior surface area is factored out of the total surface area of particles. External area obviously increases when fuel nuggets are ground, thus only the internal surface area is relevant. Measurement of surface areas of fine internal cavities is complex and depends in part on the size, affinity and applied pressures of the probe molecules used for instance in BET measurements, thus the effect of artifacts in measurement should be considered when making these measurements. The third metric is the porosity of the coal. This can be determined by the relative amount of gas or fluid taken up by internal pores on a volumetric or gravimetric basis. The metrics may be gauged after removal of the volatiles and water contained therein, or by factoring out the known content of volatiles and water in the material under study. Under the method of the invention, materials are provided that preserve or magnify the high porosity, the high surface area, and or the dearth of density, each with respect to the fixed carbon infrastructure of the solids.

Surprisingly, steam-coal suspensions obtained by the invention method have been burned essentially completely at a temperature well below 2600° F., thereby avoiding formation of nitrogen oxides from the dinitrogen in air. Occasional "sparklers" have been observed in some trials; these are believed to be due to aggregates of particles held together by static charges where insufficient water was present in hydration layers, or held together by oxidative bonds formed when air was not sufficiently excluded from the mill. Without being limited by theory, it is believed that the ability to burn this coal so cleanly may be due in part to the avoidance of refractory organic bond formation, in contrast to grinding and burning of ordinary coal. It is contemplated that the micronized particles of the invention will offer analogous economic and environmental advantages for gasification, liquefaction and cracking processes.

Fuel solids provided by the invention method also have surprising stability in suspension in either hydrophilic media such as water, hydrophobic media such as no. 6 oil or recycle oil or donor solvent such as tetralin, and water-and-oil mixtures. That is, the new fuel solids remain suspended in such media for 7 days or more, even in the absence of surfactants. This is particularly useful since it provides an inexpensive improvement for enriching the energy content of aqueous media such as black liquor by the addition of the new coal microparticles.

The distribution characteristics of catalysts or other secondary substances placed on surfaces of the fuel solids according the present invention are a function of how the substance is distributed. For instance, it is expected that catalysts that are added as water-insoluble solids and for which temperatures in the mill are below their melting point, associate with the fuel surfaces as fine particles, either physically embedded in the surface or more loosely associated. In order to obtain a finer distribution of such catalysts it is helpful to employ them in an already finely ground form before their addition to the mill. By contrast, catalysts that are added as solids and handled in the melt state in the mill, or which otherwise undergo flow at the impact energies present in the mill, are expected to "smear" on the surfaces of the solids.

Such smearing promises a more intimate and more extensive association between the fuel surface and the catalyst. Catalysts such as molybdenum sulfide, which can smear by shedding layers similarly to friction-based exfoliation by graphite, provide an alternate smearing mechanism during milling. Water-soluble catalysts are expected to provide the most intimate association between the fuel surface, since substantially all exposed surfaces are exposed to steam, the steam can dissolve such catalysts, and evaporation of steam tends to leave a fine residue of substances that have been dissolved in it. Solids layered with catalysts are also contemplated by permutations of these methods, for instance, providing to the mill a metallic catalyst dissolved in an acid medium, whereby though the metallic catalyst is not water soluble, it is nevertheless finely dispersed in the shear field and vortexes and on the fuel particles. Optionally a plurality of catalysts can be provided on the fuel surfaces.

The dispersion of catalytic solids is described here in terms of the surface area of the fuel solid that is covered and or eclipsed by the catalyst. The meanings of the terms "covered" and "eclipsed" are provided in the definition section above. However, topographic features of the catalytic solids deposited on the fuel solids depend upon deposition conditions, and they can vary considerably, so the morphology merits some further explanation. Consider very fine catalyst particles that are prolific but which have only a small portion of each particle embedded in fuel solid surfaces. In such a configuration the catalyst may account for over 50% of the total solid surface area, particularly if the catalyst particle topography is rough, even though the catalytic interface with the fuel solids may represent only 10% of the surface area of the fuel solids themselves. On the other hand, the actual working surface of the catalyst is at the interface with the fuel solid, so the remainder of the catalytic surface is less available to the fuel, though the catalyst surfaces that are not in direct contact with the fuel may still carry on catalytic functions such as coordinating with hydrogen or with donor solvents. And yet a direct interface between catalyst and fuel solid is not completely necessary for catalytic efficiency. For instance, a graphene-like sheet of catalyst held away from but in close proximity to a fuel solid surface at room temperature is expected to be almost as efficient in catalysis at high temperature as a directly interfacing catalyst surface.

The surfaces of internal pores in fuel solids of the invention are expected to have surface deposits of water-soluble catalysts when such catalysts have been present in the mill, however it is difficult to analyze the extent and depth of these internal deposits routinely or thoroughly. Thus external surfaces—i.e., the surfaces of the outermost faces of a particle, not of its internal pores—are most conveniently used for the description of the extent of dispersion of secondary substances on fuel solids. This is not a precise metric because the choice is often arbitrary as to where an external surface ends and a channel, pore or other void space begins.

By means of the invention apparatus and method, fuel particles—and in particular coal particles—covered and or eclipsed at their external surface by one or more secondary substances to any extent desired may be obtained. The thickness of the deposited secondary substance may also be engineered. In a particular embodiment the percentage of the fuel solids' external surface area covered and or eclipsed by secondary substance(s) is at least 30%. In a further embodiment it is at least 40%; in another embodiment it is at least 50%. In yet another embodiment it is at least 70%. In another embodiment it is at least 85%. In still another embodiment it is at least 95%. In a further embodiment it is approximately 100%. The thickness of deposits of secondary substances may be quite fine, and under controlled conditions the deposition may be as thin as a molecular mono-layer. In a particularly useful embodiment, the layer is between 1 and 1000 nm thick, inclusive; in a further embodiment it is between 2 and 200 nm thick; in another embodiment it is between 3 and 30 nm thick; in yet another embodiment it is between 5 and 20 nm thick; in still another embodiment it is between 10 and 15 nm thick.

As noted above the secondary substances provided on the fuel solids may be catalysts, catalyst precursors, absorbents, or other substances. In particular, fuel solids containing surface-deposited catalysts based on iron, nickel, cobalt, platinum, palladium, rhodium, molybdenum, potassium, sodium, calcium, aluminum, silicon, magnesium, cerium, and manganese or their oxides or carbonates are anticipated to be particularly useful. Likewise fuel solids containing surface-deposited absorbents based on oxides or carbonates of sodium, potassium, calcium, magnesium, and manganese are anticipated to be particularly useful.

In any case, the resulting product forms more stable suspensions in and has improved compatibility in both coal-oil slurries and coal-water slurries. In the prior art, surfactants were typically required to stabilize slurries of coal, that is, to maintain them as suspensions for extended periods, and were added either before or after a scrubbing step. Surfactants commonly adsorb onto coal particles by their hydrophobic end, leaving the hydrophilic end free. Many types of surfactants have been used for coal slurries; and in many cases had to be present in 3-5% by weight in order to stabilize the suspensions, though in some cases as little as 50 ppm might be used. Ethoxylated hydrocarbons such as those in a series provided by Rohm & Haas are among the more important surfactants in the United States for coal slurries.

Surfactants pose several problems. First, their materials costs is significant relative to the commodity costs of coal. Also because of the heterogeneous diffusion of surfactants they require a thorough mixing step, which imposes a process cost. Surfactants are also known to affect the combustion, liquefaction and gasification properties of coal particles. Surfactants are believed to hinder combustion by interfering sterically with the ability of atmospheric oxygen to reach the surface of the coal. Likewise, surfactants are thought to migrate to the most chemically active sites on the coal surface, impeding catalyst access and effectiveness for coal conversions.

Fuel Slurries and Suspensions

Suspensions made from fuel solid particles according to the present invention may be made as described above and have particular value. Thus aqueous suspensions may be burned in a diesel engine, and oil or oil-and-water suspensions may be burned in an oil burner. Alternatively the suspensions may be gasified, for instance in a gasifier unit, or may be liquefied for instance in a liquefier unit. Suspensions typically have up to about 40% of fuel solids by weight as calculated on a moisture- and ash-free (MAF) basis. In one embodiment the suspensions have between 20% and 40% of fuel solids by weight. In another embodiment they have between 25% and 37% of fuel solids by weight. In a further embodiment they have between 30% and 35% of fuel solids by weight. About 25% to 35% by weight of fuel solids is a particularly convenient range for suspensions, and in particular about 30% by weight of fuel solids is useful, because such suspensions flow readily yet also have a substantial percentage of their energy output provided by the solids. The percentage of fuel solids by weight in these embodiments is calculated by including all the components of the particles in the weight of the fuel solids before suspension: these include the carbonaceous infrastructure, secondary substances, particle water content, and particle volatiles content in the weight of the fuel solids.

The purpose of a coal-oil mixture is, for example, to extend the supply of #6 oil, residual fuel oil, or ship bunker fuel. The inventor was among the first in the industry to make barge loads of coal-oil mixtures. Typically coal represents 30-40% of the coal-oil mixture by mass. The energy in such a mixture is determined by the mass ratio of coal in the oil. Pure oil has about 18,000 BTU/pound×400 lb. oil/barrel=7,200,000 BTU's per barrel. The energy in coal alone is about 35,000,000 BTU/ton.

Coal-water slurries are useful in that a diesel engine can be fueled with them directly, with essentially identical performance to diesel fuel. The coal-water slurries leave ultrafine ash particles upon combustion, however A.D. Little provided a method to remove them from the exhaust. A.D. Little also found that the slurries led to erosion problems; the smaller and more uniform particles of the present invention provide a way to avoid this. Coal-water slurries are also useful for gasification processes, which otherwise uses particulate coal. Stable surfactant-free mixtures are particularly valuable.

The slurries are also useful for handling fuels that have a "sticky" phase at high temperature when in the unsuspended solid form. Lower-ranked coals such as those from Wyoming, Montana, Alaska, and western Canada do not become sticky during heating, but bituminous coal such as Illinois #6 becomes very sticky. Slurries minimize the problem of handling these at high temperature.

The slurries also solve a transportation problem. The bituminous coals are expensive to produce because they require either underground mines, which are costly to develop and also face extra safety issues, or because the less populated regions where surface mines are socially accepted are not convenient to unscheduled rail or barge transport facilities. The ability to create coal slurries that can be transported overland by pipeline or converted on site by liquefaction or gasification simplifies the logistics problem for handling material from remote mines, particularly for a slurry that does not cause wear on pumps, valves or the like.

Improved Coal Body Surfaces

The hydration layer on individual particles is believed to be responsible for the preventing mechanical fusion and discharging static electricity from the ultrafine particles. Also, the novel ambiphilic property was initially discovered after addition of sufficient water to drop the steam temperature noticeably for bituminous East Kentucky coal that had been ground to a 40-micron maximum particle diameter by the invention method; this cooling of the steam prevented dehydration from reaching completion by evaporation upon venting of product from the mill. As an example of calculating hydration layer thickness, consider re-addition of 5% water by weight to anhydrous coal, corresponding to about $5 \times 10^{-8}$ m$^3$ added water per gram of anhydrous coal. For a bituminous sample having about 200 m$^2$/g surface area (anhydrous, but with volatiles present), if a 5 mass percent hydration layer is uniformly distributed across the entire surface area this corresponds to a hydration layer about $2.5 \times 10^{-10}$ m thick on the coal surface, or about twice that thickness if only half the surface is hydrophilic. That represents one to two monolayers of water across the entire surface, depending upon how the water molecules are oriented. However, hydration layers may be substantially thicker. Also, hydrophobic volatiles exist at coal surfaces, thus some surface zones may remain unhydrated due to phase separation phenomena. In addition, roughness on external surfaces leads to some filling of external surface "valleys" with water, thus hydration layers will be thicker there. And although capillary action can occur within seconds or minutes to draw water into internal pores, the complete filling of pores with water or other solvents can require days or even months at ambient pressure in part because gas displacement is hindered. Thus unless those pores retain water or, e.g., pump moisture during thermal cycling, some internal surfaces remain unwetted on the time scale for combustion or chemical conversion applications.

Where desired, more thorough wetting throughout coal particles can be accomplished by using coal particles from which not all of the steam is evaporated. That is, the coal retains some condensed water following milling by the invention method. However, for purposes of exploiting ambiphilic behavior in a suspension, the most important surface sites are the external particle surfaces and the surfaces of the largest pores that open at the external surfaces. Thus at least for ambiphilic compatibility of the external surfaces, the choice is not critical as to whether water is re-added to anhydrous milled coal or whether water is retained from the milling step.

In one embodiment the invention provides external coal body surfaces that have a hydration layer in the thickness range of 0.25 to 1000 nanometers. In another embodiment the invention provides external coal body surfaces that have a hydration layer in the thickness range of 1 to 500 nanometers at their external surfaces. In a further embodiment the provides external coal body surfaces that have a hydration layer in the thickness range of 3 to 300 nanometers at their external surfaces. In yet another embodiment the provides external coal body surfaces that have a hydration layer in the thickness range of 4 to 100 nanometers at their external surfaces. In yet another embodiment the provides external coal body surfaces that have a hydration layer in the thickness range of 5 to 50 nanometers at their external surfaces. In each of these embodiments the hydration layers may optionally be present in zones that are interspersed with zones of unhydrated external surfaces on the coal.

In another embodiment, the coal particles of the invention method may be provided with from 0.25 to 10% of retained or re-added water. In another embodiment they may have 1 to 8% of retained or re-added water. In still another embodiment they may have from 3 to 6% of retained or re-added water. In a further embodiment the coal particles of the invention method may be provided with about 5% of retained or re-added water.

Hydration layers can be surprisingly stable when they are juxtaposed to a carbonaceous surface. Although some fraction of that water may boil off at the ordinary boiling point of water, monolayers of water can remain adsorbed on carbonaceous surfaces such as diamond up to ca. 570° F. (ca. 300° C.). This strong association at interfaces between water and carbonaceous matter is believed to be responsible for the persistence of the ambiphilic property observed in the invention method. Thus instead of shedding their hydration layers to undergo phase separation and precipitation of solids when coal particles are placed in aqueous suspensions, water at the coal surfaces appears to remain adsorbed to the coal, attracting solvation layers of hydrophilic liquid media even in the absence of surfactants. The failure of coal particles from the prior art to remain stably suspended in water without surfactants is tentatively attributed herein to extensive smearing of hydrophobic volatiles across particle external surfaces during mechanical crushing.

The persistence of water at particle surfaces normally would suggest that those particles could not form stable suspensions in hydrophobic liquid media without the substantial use of surfactants. However unexpectedly, coal particles made by the present invention do form stable suspensions in oils even without surfactants. Without being bound by theory, that result is rationalized here by analogy to the ambiphilic external surfaces of blood cells, which have a mosaic of hydrophilic and hydrophobic zones on the surface of the cell envelope. Under this hypothesis, for coal the comparable hydrophobic zones are patches of organic volatiles at the external surface of the coal, whereas the hydration layers on the carbonaceous infrastructure populate the hydrophilic zones. It is thus the balance of the size and number of the zones that enables compatibility for suspension in either hydrophilic or hydrophobic media. The zones of volatiles, in turn, provide the hydrophobic or oleophilic surfaces needed for compatibility in oil. It is possible that where hydration layers are only one or two monolayers in thickness, the oxygen atoms of the water molecules are uniformly oriented outwardly in a polar media and that this also contributes to the hydrophobic character of the coal body surface. But possibly the hydration layers have some other orientation of adsorbed water molecules in a polar media.

In one embodiment invention provides coal body external surfaces having a ratio of hydrophilic surface area to hydrophobic surface area in a range between about 25:75 and about 75:25. In another embodiment the ratio is between about 35:65 and about 65:35; in another embodiment the ratio is between about 45:55 and about 55:45.

Another surprising effect of hydration layers is their ability to prevent coal particles from aggregating. Coal particles made by the invention method aggregate when they are anhydrous, but the aggregation ceases immediately and essentially completely when hydration layers are provided. This is opposite to what would be predicted by the law of affinity between like compositions. By that rule, a hydrated coal surface would be expected to show a preference for associating with a hydrated zone on a neighboring particles, and for association between volatiles at surfaces of neighboring particles. Thus it appears likely that the effect of water in preventing aggregation is to dissipate or muffle the effect of static electric charges on the coal.

The chemically most reactive sites for combustion and chemical conversion have low activation energies for oxidation or catalytic reaction. At ordinary reaction temperatures, these sites are kinetically accessible for reaction only to the extent that they populate a surface of a particle. Unfortunately, for other reasons these moieties seem to be the favored sites for forming an association between the solid surface and surfactants, so surfactants kinetically hinder the approach of other molecules and reduce the efficiency of combustion or chemical conversion. The invention reduces or eliminates the need for surfactants in suspensions. Thus the invention provides ambiphilic hydrated coal body surfaces that have a high population of available reactive sites with a low activation energy for reaction in a pristine (i.e., free of dioxygen, dinitrogen and the like) environment. In one embodiment the coal body surfaces are in an aqueous suspension and the reaction is combustion. In another embodiment the coal body surfaces are in an oil suspension and the reaction is combustion. In yet another embodiment the coal body surfaces are in an oil-and-water suspension and the reaction is combustion. In a different embodiment the coal body surfaces are in aqueous suspension and the reaction is a chemical conversion. In another embodiment the coal body surfaces are in an oil suspension and the reaction is a chemical conversion. In still another embodiment the coal body surfaces are in an oil-and-water suspension and the reaction is a chemical conversion. In some embodiments the chemical conversion is hydrogenation. In a further embodiment the ambiphilic coal body surfaces are in a hydrophobic liquid suspension, the reaction is hydrogenation, and the hydrophobic liquid comprises a hydrogen-donating organic substance.

In some embodiments of the invention the ambiphilic coal body surface is populated with a secondary substance. Particularly useful substances in this respect include the catalysts, catalyst precursors, and absorbents disclosed above. Keeping in mind the relatively small amount of water and the narrowness of the hydration layers, the secondary substances may actually be dissolved in the hydration layer. Virtually any ratio of water to soluble secondary substance can be used in the hydration layer, but using 1% to 50% by weight of the secondary substance in the hydration layer is particularly useful. In another embodiment, the weight percent of secondary substance in the hydration layers is between 5 and 25%; in yet another embodiment it is between 10% and 20%; in another embodiment it is about 15%. Loading the internal pores of coal with water, steam or hydrated secondary substances will be particularly useful in situations where rapid but uniform reactions are needed, whether in combustion, hydrogenation, liquefaction or gasification.

A secondary substance may also be present as a solid on the ambiphilic coal body surface, either directly over a hydration layer, under a hydration layer, embedded in the coal surface, or associated with a hydrophobic zone on the ambiphilic surface. In a particular embodiment the percentage of the ambiphilic coal body surface area covered and or eclipsed by secondary substance(s) is at least 30%. In a further embodiment it is at least 40%; in another embodiment it is at least 50%. In yet another embodiment it is at least 70%. In another embodiment it is at least 85%. In still another embodiment it is at least 95%. In a further embodiment it is approximately 100%. At higher loadings the properties of the secondary substance mask or swamp out the suspension benefits of the ambiphilic surface of the coal unless the secondary substance is soluble, defoliated or perhaps friable in the suspension medium. The thickness of deposits of secondary substances may be quite fine, and under controlled conditions the deposition may be as thin as a molecular mono-layer. In a particularly useful embodiment, the layer is between 1 and 1000 nm thick, inclusive; in a further embodiment it is between 2 and 200 nm thick; in another embodiment it is between 3 and 30 nm thick; in yet another embodiment it is between 5 and 20 nm thick; in still another embodiment it is between 10 and 15 nm thick.

Combustion

The combustion temperature is a function of the strength of bonds that must broken when oxidizing the fuels—the stronger the bond, the higher the temperature—and of the kinetic energy required for mass transfer of compounds to or from reaction sites. Solid fuels in particular can require higher temperatures because of the inefficiency of heat transfer to the particle cores, and because of the kinetic hindrance for oxygen to reach those bonds. The combustion of complex fuel solids such as coal normally occurs at temperatures significantly above 2600° F. (1450° C.). At that temperature the $N_2$ gas which makes up about 70% of the earth's ambient atmosphere is oxidized along with the fuel solids, forming $NO_x$ compounds that give smog its brown color. By contrast, steam suspensions of the coal solids of the invention have been found to burn at apparent temperatures in the range of about 1800-2400° F. (about 1000-1350° C.), thus they avoid the cross reaction of atmospheric nitrogen and oxygen.

Hydration layers on the surface of coal or resinous wood particles would boil off at even the lower combustion temperature. However the useful properties of the present invention can still be exploited in combustion by providing the fuel solids—with a hydration layer present—as a dispersion, such as a suspension in a combustible liquid fuel. Alternatively the particles may be provided as a dispersion in water, steam or a low boiling solvent, whereby the particles are essentially spray-dried by injecting the dispersion in a spray pattern at high speed, and then immediately burning the dehydrated injected spray or (if involved) the gasified coal. The dispersion and spray-drying methods minimize the presence of higher-burning aggregates, and the sprayed particles may be burned directly while the just-dried particles are still airborne. The smaller the particle, the faster and more uniformly its interior may be heated. For sufficiently small particles of the invention, the reaction can be nearly simultaneous with the application of heat, thereby avoiding overheating, tar formation, coking, and charring of the particle surface found in longer-reacting processes.

The fuel particles thus provided may be loaded with combustion catalysts such as those already described above, on solid support materials such as silica or alumina as described above. The liquid dispersion media may be flammable, such as number 6 oil, recycle oil, kerosene, gasoline, diesel fuel, or other flammable media. And or the liquid dispersion media may be highly volatile for spray-drying purposes, such as aqueous, methanol, ethanol, propanol (e.g, normal, iso or sec) or other low alcohol. The combustion may be conducted in an oil burner, diesel burner, or gas flame. For instance, the gas flame could be a methane flame, natural gas flame, white gas flame, or other flammable gas.

In one embodiment of the instant invention coal steam is ground to micron or multi-micron fineness, resulting in diverse structures; then the micronized coal is made into a steam suspension, and this suspension is burned at temperatures as low as 1800° F. (980° C.). In combustion experiments for this work the exhaust was colorless and completely transparent, like the burning of natural gas. The appearance of "sparklers" in the flame was observed only when the coal had been insufficiently ground or insufficiently dispersed. These sparklers are attributed to the presence of small clusters of fused or agglomerated coal powder which have a lower surface area per mass and cannot react as quickly during gasification, thus they require longer reaction times to reach a thermodynamic equilibrium and do not undergo complete gasification in the flame before combustion. By comparison, normal micronized coal burns at about a rate that one or two orders of magnitude lower than an obvious black body, requiring temperatures in the range of 2600-2800° F., with a yellowish opaque flame and considerable amount of unburned carbon. Oil suspensions of the particles of the invention can also be burned with improved properties, however the to obtain the most efficient combustion and least coking of the oil, the liquid component of the suspensions should be a combination of oil and water.

Reaction kinetics of coal particles prepared by the invention method have been found to be as much as 2.8 times faster than those of conventional coal particles of the same size, and it is believed that the surface area of the internal surface area of the invention coal particles may be greater by one to three orders of magnitude than the external surface area. Also, by analogy to the combustion of natural gas that it resembles, the combustion of the coal water suspensions and coal steam are believed to proceed indirectly, first by a reaction between coal and steam to gasify the coal—i.e., forming syngas—followed by atmospheric oxidation of carbon monoxide to carbon dioxide and of hydrogen to water.

Liquefaction

Direct liquefaction proceeds by liquefying coal directly through the partial breakdown of the coal macromolecule under heat and pressure, with subsequent catalytic hydrogenation at higher pressure. Indirect liquefaction proceeds by gasification of coal, and catalytic polymerization of the resulting gases such as by Fischer-Tropsch, Exxon methanation, or the Mobil syngas to methanol process. Liquefaction is currently out of favor as a source of alternative fuels, however the present invention provides a more economically attractive approach to coal liquefaction than prior technologies. Direct liquefaction if thermodynamically more efficient and should result in lifecycle emissions of half as much carbon dioxide as is produced by indirect liquefaction.

Some key factors optimize the liquefaction of coal for the present invention. Excluding ambient oxygen gas during milling and thenceforth until liquefaction is completed avoids retrograde reactions in which radicals from fragmented coal combine and form refractory bonds. Refractory materials formed in traditional milling cannot be liquefied by conventional means apart from cracking, which is cost-intensive. Providing a source of carbon monoxide, low alkanes and or hydrogen gas in the mill in combination with liquefaction catalysts also facilitates liquefaction in the mill and afterward, and can also exclude ambient oxygen gas. The carbon monoxide also extracts sulfur and oxygen atoms from the coal. Retaining the hydration layer on milled materials until liquefaction is complete also facilitates the conversion.

The lower-rank sub-bituminous coals or lignites liquefy most readily but give lower yields and lower ratios of liquids to gases than bituminous coals, and normally produce fuels higher in oxygen. High rank bituminous coals often require more severe conditions, and anthracite is generally quite difficult to hydrogenate to a liquid. In part the ease of liquefaction is correlated to the carbon:hydrogen atomic ratio of the starting material: the more hydrogen, the better. Bituminous fuel is useful for several reasons. Its atomic ratio of H:C is roughly 0.7:1.0. Liquefaction of coal requires attaining a 1:1 atomic ratio of H:C (1:12 on a weight basis). Lignite and sub-bituminous coal sources are abundant, and these coal sub-types are also very reactive, though it is better to remove some or all of their water before liquefaction or gasification. Coals containing the minimum H:C ratio produce many insoluble and refractory substances upon heating, which renders them less efficient as combustion fuels. A more preferred ratio is an H:C atomic ratio of 1.2:1. This is relatively high versus the results of others. An H:C atomic ratio of 1.5:1 is probably the maximum practical achievable level.

In one embodiment liquefaction is achieved very rapidly (i.e., in 10 to 15 seconds) by heating the coal particles rapidly in a hydrogen gas atmosphere with a liquefaction catalyst. By contrast, the contact time for mixtures of coal and vehicle oil normally require from about 20 minutes to 1 hour at pressure and temperature for as much as 3-4 barrels of liquids per ton of coal in most hydrogen-donor solvent schemes.

Although there may be a soak time at a somewhat elevated temperature during dissolution, the rate of heating to liquefaction temperature should be as rapid as possible to prevent repolymerization of reactive fragments formed from the rupture of the weakest bonds in the coal at temperatures lower than those for which hydrogen transfer becomes rapid. Temperatures to produce liquids typically range from 750 to 1020° F. (400 to 550° C.). The lower threshold for liquefaction is about 570° F. (300° C.), which corresponds to the upper threshold at which hydrogen and or adsorbed hydration layers boil off the surface of carbonaceous materials. The properties of the comminuted particles of the invention are believed to enable faster liquefaction and gasification, though not necessarily lower-temperature or lower-pressure conditions for liquefaction or gasification.

It is believed here that bulk coal suffers from low (surface) area-to-volume ratios, thus its heat transfer from the surface to the center of a coal particle is inefficient because a thermal gradient exists in which the lowest temperature is at the particle core. Also, coal which is heated at too high a temperature even in the absence of oxygen is believed here to produce internal radicals that react to form a highly cross-linked network of refractory bonds known as a char; chars are characteristic of coke, for instance. Chars burn with less efficiency than ordinary coal; that is rationalized here as being due to the difficulty of breaking cross-links thermally, and the loss of easily oxidizable groups on the surface; the same characteristics will make it unsusceptible to other chemical conversions apart from a cracking process. By contrast, non-char coal materials that lack a highly cross-linked network can be converted to other desirable fuel types readily by a liquefaction or gasification process. Thus it is preferable to use fuels with small particles, because their interior is heated relatively quickly and uniformly relative to the remaining mass of the particle; the combination of a small particle size and a liquid medium around the particle provides a minimum of byproducts from overheating the surface.

The pressures required for liquids production by hydrogenation range from about 500 to 4,000 psi. The rank of coal, liquefaction scheme, desired end product, mineral matter and added catalyst present, and extent of conversion determine the optimum pressure. Lower rank coals can be liquefied at lower pressures. These pressures can be accommodated for liquefaction within the mill itself. Note that the design and operating costs for mills are lower when the plant specifications call for liquefaction to be performed subsequent to and not during milling. Metals can catalyze coal liquefaction and are especially effective in the temperature range in which liquids are formed. It is helpful though not absolutely necessary to conduct the liquefaction in the presence of the metal-containing ash. It is helpful to have some water present; in the range of 4% to 10% by weight relative to the fuel is a convenient range. Complete drying has been demonstrated to be deleterious.

The chemistry of liquefaction reactions in the invention, i.e., in the mill and beyond, can be summarized as follows.

Steam reformation of coal or natural gas→

$H_2$ (desired product)+$CO_2$ (collectible, sequester-able product)+CO

CO+heteroatoms→heteroatom oxides (collectible, removes poisons of catalysts)

Solid fuels+$H_2$→liquid fuels

One advantage of the ability to reform coal directly to obtain the needed syngas is that the method does not rely on the availability of natural gas. Contrast this with Canadian coal tars, which are found in combination with abundant natural gas but whose processing by conventional liquefaction will require consumption of all the natural gas present in those tars.

If hydrogenation proceeds too far, it typically results in $C_1$-$C_4$ gas byproducts, which is an unnecessarily costly way to make natural gas. Typical byproducts also include carbon dioxide, water, and ammonia. The water, ammonia and low alkane byproducts from conventional liquefaction represent an enormous waste stream because the hydrogen gas used to make them is "wasted," since these products can be had more inexpensively by other routes, and much more carbon dioxide is produced than in DCL.

The efficiency of hydrogen use for liquefaction is as follows. For ICL or indirect liquefaction via syngas and catalytic conversion, typically a ton of coal yields about 2 barrels or less of crude oil, though producers aim for an efficiency of 2.5 barrels per ton. The maximum theoretical yield is 3.5 barrels per ton; the attainable yield by the invention method is anticipated to be in the range of 3 barrels per ton of coal for a grade such as sub-bituminous or Wyodak coal. In any case, the common practice for liquefaction arts is to inject hydrogen gas into the coal-oil mixture; this slurry maximizes the amount of product per ton of coal. The reaction proceeds as outlined below.

Coal−(steam+grind)→processor−(inject steam+¼″ coal)→ultrafine coal

Scrub ultrafines with "recycle" oil of any type, e.g., refinery bottoms

Recycle oil extracts particulates from steam with the mist→add to coal-oil mixture Coal-oil mix→storage (inventory). The invention provides an improved coal-oil slurry.

Inventory→(a) liquefaction, (b) hydrogenation, (c) clean-up, and (d) re-work.

Conversion efficiencies for transforming solid to liquid can be on the order of 95%; efficiency for converting oils is on the order of 60-65%, where efficiency is calculated on an MAF basis in the absence of nitrogen, oxygen and sulfur moieties in the beginning fuel.

Heteroatom removal can be accomplished during liquefaction or in a prior step in the present invention by the following means; this removes poisons to catalysts for later processing. The variability of impurities from different natural sources has a limited effect on efficiency of operation, because liquefaction plants are typically tuned to coal produced by particular mines in order to obtain consistent results with the content of water, ash, sulfur, and heat output. Thus whether the plant burns, liquefies, gasifies, or some combination thereof, the variance in the stoichiometry will be minor.

S→$SO_2$ (optionally by $O_2$)

Natural gas ($CH_4$)+steam ($H_2O$)→CO+3$H_2$

CO+O in the coal→$CO_2$

CO+S and N in the coal→>CO compounds $CO_2$+S and N in the coal→$SO_2$+$NO_x$+CO Gasification The DOE has attempted to identify the best technologies for coal gasification and combustion, for instance Nexgen and the IGCC technologies, as well as conversion to liquid fuels and valuable byproducts. However the industry has not widely adopted these, because their reliability and energy efficiency is too low, partly because of the extreme operating conditions and substantial losses of heat they cannot recoup from gasifiers. Nevertheless improved processes to obtain fuel gases must be found. Recently natural gas was available for $8 per million BTU, but is expected to rise to $14-$15 per million BTU as supply fails to match demand. In many ways natural gas is also more valuable as a chemical feedstock than as a fuel, and the demand for feedstocks will also tend to drive up the price. Bituminous coal and lignite are useful for gasification for the same reasons as for liquefaction.

An exemplary common temperature range for gasification is about 1200-1600° F. (650-870° C.), though the temperature is lower when catalysts are present. By contrast many commercial gasifiers must operate at 2300-2400° F. (1260-1320°

C.) and may even be in the range of 2600-2800° F. Consequently their ash is converted to molten slag that is not merely worthless but costly to dispose of. At high temperatures and pressures $CO_2$ and $CH_4$ also represent a substantial portion of the gas produced in most gasifiers, and conventional gasification units also require the presence of a small, controlled amount of oxygen in order to initiate a domino reaction by exothermic combustion. By contrast to conventional methods, the current invention appears to produce little or no $CO_2$ or $CH_4$ during gasification; this conclusion is based in part on Gibbs free energy minimization simulations for input slates using ASPEN™ software, now known as ASPENPLUS™, from the AspenTech, Aspen Technology, Inc., 200 Wheeler Road, Burlington, Mass. 01803 USA. Gasification by the invention method also requires no oxygen to be present, by contrast to prior art, moreover the conditions of the invention method produce dry friable ash that has significant marketable value as a material in its own right. The chemistry of gasification reactions for the invention can be summarized as follows.

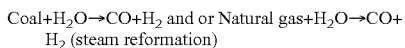
Coal+$H_2O$→CO+$H_2$ and or Natural gas+$H_2O$→CO+$H_2$ (steam reformation)

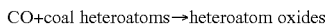
CO+coal heteroatoms→heteroatom oxides

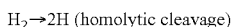
$H_2$→2H (homolytic cleavage)

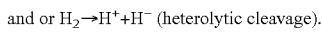
and or $H_2$→$H^+$+$H^-$ (heterolytic cleavage).

Byproducts can be removed, for instance using absorbents for $H_2S$ in the gasifier and absorbents for $SO_x$ in combustion. The absorbents sublime at low temperatures; the MgS and CaS form is desirable because it can be caught in bag. IGCC provides byproducts in the form of slag. Finely divided, clean ash is very salable as cement, for instance at $25/ton or $22.50 per ton of coal, and avoids the cost of remediation. $SiO_x$ and $AlO_x$ form slag along with alkali and alkaline earth compounds, which soften at boiler temperatures.

Ordinarily refractory materials are difficult to gasify, however it is contemplated here that at sufficient extents of comminution and in the presence of water, suspensions of refractory materials comminuted to a sufficiently small size by the invention method may undergo smooth in-flame gasification as discussed above for combustion by the invention method.

In-Line Configurations

The processor may be used to advantage in various in-line configurations. Referring now to FIG. 4, an exemplary embodiment is described here for illustrative purposes. A steam source (1) is provided which supplies steam for the shear field and vortexes in the processor (4). Optionally steam source (1) may also provide steam for drying and de-aerating the coal source (2) prior to its introduction to the processor (4). Here the coal has already been crushed to ¼"×0" nuggets. The steam from source (1) and the coal from source (2) may also optionally be supplemented with a secondary substance (3) before their introduction to the processor (4). An optional absorbent (5) or optional catalyst or catalyst precursor (6) may be provided to either the coal source (2) or directly to the processor (4).

The steam products (7) contain the classified, comminuted fuel particles and are vented from the processor (4); in one embodiment the steam products (7) are provided in combination with gas from a clean-up unit (9) for clean boiler fuels (10) in conventional power generation. In another embodiment the steam products may be routed directly to a gasifier (8) followed by clean-up in unit (9). In a third embodiment the steam products (7) are routed to an oil-, water-, or oil-and-water-scrubber (16) such as a Venturi scrubber, and from there to a slurry unit (17) in which catalyst may optionally be added to complement or substitute for the catalyst coating in the processor (4). The slurries are sent in one embodiment to a liquefaction unit (18). Products of such liquefaction units are typically useful for synthetic crude oil, jet fuel and gasoline. Alternatively the slurries can be routed to a gasifier unit (19), and from thence to the gas clean-up unit (9).

Gas from the clean-up unit (9) may then be processed in a synthesis manifold or for a single dedicated synthesis use, as follows. In one embodiment the gas is sent to a hydrogen separation unit (11); such units are useful for fuels for turbines, boilers, steam and electricity production. In a different embodiment gas from unit (9) is routed to a unit (12) for syngas production for refinery processes; such units are useful for production of hydrogen, fertilizers, ammonia, etc. In yet another embodiment the output of unit (9) is used in a methanol synthesis unit (13) to provide industrial chemical feedstocks and liquid transport fuels. In still another embodiment, the product of unit (9) is directed to a dimethylether (DME) synthesis unit (14); DME synthesis provides clean high-energy liquids for transport fuel. In a fifth embodiment, the output of unit (9) is employed in Fischer/Tropsch synthesis to obtain clean diesel.

EXAMPLE 1

Calculations for Using a 650° F., 200 psi Steam Source

Assumptions and figures are shown for exemplary calculations at an initial temperature of 650° F. and 200 psi in the boiler acting as a steam source for a grinder constructed according to the invention. FIG. 1 graphically depicts the result for calculating dryness of the resulting coal that is obtainable based on only the input levels of steam based on these assumptions.

Assumptions:

| | | |
|---|---|---|
| Steam Conditions: | 650° F., 200 PSI before nozzles | |
| Inlet Temp Coal | 60° F. | |
| Coal/Steam Ratio | 0.75 lb steam/lb coal | |
| Enthalpy before nozzles | 1,350 | BTU/lb steam @ 650/200 psi inlet |
| Enthalpy after nozzles available to heat coal and moisture | 1,160 | inside grnider |
| Enthalpy Available | 190 | BTU/lb steam available |
| or enthalpy per lb of coal | 143 | BTU enthapy per pound coal incl moisture |
| Exhaust Temperature: | 250° F. | |
| delta T | 190° F. | |
| Specific Heat Coal | 0.201 BTU/lb | heated to boiling point @ 250° F. |
| Specific Heat Water | 1 BTU/lb | heated to boiling point @ 250° F. |
| Evap # water at boiling | 961.7 BTU/lb | |

Coal is 100% wt less water

EXAMPLE 2

Calculations for Using a 700° F., 200 psi Steam Source

Assumptions and figures are shown for exemplary calculations at an initial temperature of 700° F. and 200 psi in the boiler acting as a steam source for a grinder constructed according to the invention. FIG. 2 graphically depicts the result for calculating dryness of the resulting coal that is obtainable based on only the input levels of steam based on these assumptions.

Assumptions:

| | |
|---|---|
| Steam Conditions: | 700° F., 200 PSI before nozzles |
| Inlet Temp Coal | 60° F. |
| Coal/Steam Ratio | 0.75 lb steam/lb coal |
| Enthalpy before nozzles | 1,375 BTU/lb steam @ 700/200 psi inlet |
| Enthalpy after nozzles available to heat coal and moisture | 1,160 inside grnider |
| Enthalpy Available or enthalpy per lb of coal | 215 BTU/lb steam available |
| | 161 BTU enthapy per pound coal incl moisture |
| Exhaust Temperature: | 250° F. |
| delta T | 190° F. |
| Specific Heat Coal | 0.201 BTU/lb heated to boiling point @ 250° F. |
| Specific Heat Water | 1 BTU/lb heated to boiling point @ 250° F. |
| Evap # water at boiling | 961.7 BTU/lb |

Coal is 100% wt less water

EXAMPLE 3

Calculations for Using a 750° F., 200 psi Steam Source

Assumptions and figures are shown for exemplary calculations at an initial temperature of 750° F. and 200 psi in the boiler acting as a steam source for a grinder constructed according to the invention. FIG. 3 graphically depicts the result for calculating dryness of the resulting coal that is obtainable based on only the input levels of steam based on these assumptions.

Assumptions:

| | |
|---|---|
| Steam Conditions: | 750° F., 200 PSI before nozzles |
| Inlet Temp Coal | 60° F. |
| Coal/Steam Ratio | 0.75 lb steam/lb coal |
| Enthalpy before nozzles | 1,400 BTU/lb steam @ 750/200 psi inlet |
| Enthalpy after nozzles available to heat coal and moisture | 1,160 inside grnider |
| Enthalpy Available or enthalpy per lb of coal | 240 BTU/lb steam available |
| | 180 BTU enthapy per pound coal incl moisture |
| Exhaust Temperature: | 250° F. |
| delta T | 190° F. |
| Specific Heat Coal | 0.201 BTU/lb heated to boiling point @ 250° F. |
| Specific Heat Water | 1 BTU/lb heated to boiling point @ 250° F. |
| Evap # water at boiling | 961.7 BTU/lb |

Coal is 100% wt less water

EXAMPLE 4

Liquefaction

This example illustrates one embodiment of co-processing coal and hydrogenation catalyst during comminution, and also illustrates the step-wise heating sequence to maximize the yield of desired products.

20 tons (2,000 pounds per ton) per hour of run-of-the-mine sub-bituminous coal is put through a hammer mill whose grate is set to deliver ¼"×0" product to a surge hopper. This sized coal is discharged by gravity to a screw feeder which is fitted with a steam jacket whose function is to evaporate some of the coal moisture and displace entrained air from the coal feed to the processor. A small portion of this steam is condensed and the condensate is returned to the boiler for reboiling. A separate feeder delivers fresh make-up catalysts from a source thereof to the first flites of the main screw feeder to be admixed with the coal during transit to the processor. This catalyst feed contains a principal hydrogenating catalyst which is a sulfide of a metal selected from the group consisting of molybdenum, nickel, cobalt. Iron, alkali metal, compounds of alkaline earth metals, and combinations thereof, may also be provided as a shift reaction catalyst.

A boiler provides superheated steam to the processor at a source temperature of about 750° F. (400° C.) and source pressure of about 200 psi, where the steam is provided to the processor at a rate of 30,000 pounds per hour. The enthalpy of this steam is 1400 BTU per pound or 42,000,000 BTU per hour. For purposes of calculation, a typical coal is exemplified here by the following composition:

| Component | Mass % of Total | Lbs./Ton |
|---|---|---|
| Ash | 12 | 240 |
| Water | 20 | 400 |
| Sulfur | 2 | 40 |
| Oxygen | 4 | 80 |
| Other | 4 | 80 |
| Carbon | 58 | 1160 |

The discharge temperature of steam from the processor is about 250° F. (ca. 120° C.), at which temperature the enthalpy of the processing steam is 1165 BTU/lb or 35,000,000 BTU per hour, a drop of 7,000,000 BTU per hour spent on evaporating coal moisture and heating the coal to exhaust temperature. Using a specific heat for coal of 0.201 BTU/lb/° F. and a 190° F. (ca. 88° C.) temperature swing, a total of 1,500,000 BTU are spent heating the coal leaving 5,500,000 BTU to evaporate moisture from the coal to an enthalpy of 1100 BTU/lb sufficient to evaporate 5,000 lbs. of water per hour. Therefore it is estimated the moisture content of the processed coal drops by 125 lbs./ton of coal to 275 lbs. water per ton or a final moisture content of 13.75%.

The coal/steam discharge from the processor reports to a scrubber wherein recycle heavy residue (derived from process) is sprayed to deliver a catalyst-containing coal in donor oil suspension to heated process intermediate storage. This suspension is about 35% coal and about 65% oil and un-reacted solids from prior runs.

Discharging processor output into a scrubber and de-mister allows the user to recover an extremely uniform dispersion of coal-supported hydration catalyst on the coal particles. It is contemplated that in the absence of oxygen and nitrogen the sulfur moiety of the catalyst adsorbs to the carbon of the coal. The mixture of hot coal and preheated process-derived recycle oil are maintained at a temperature of about 121° C. (250° F.). At this temperature the dispersion is charged with 500 psi to about 2000 psi of output of carbon monoxide and hydrogen, e.g., from a gasifier. This step is done at such a low temperature to ensure that during initial heating the donor solvent recycle oil is maximally hydrogenated by the catalyst; it is believed that this occurs by transfer of monatomic hydrogen but the invention is not limited by the theory.

A preprogrammed heating step is then imposed to a temperature of between 300 and 350° C. (572-662° F.). This step is performed to allow the carbon monoxide and water to extract many heteroatoms from the coal structure and convert the otherwise free radicals to phenolics and the like, depolymerizing the coal and avoiding creation of refractory substances.

Thereafter the gaseous overpressure is augmented by relatively pure hydrogen from the gasifier, and the temperature is increased to between about 400 and 450° C. (752-842° F.). It is believed that as the temperature increases the contribution of the hydrogenated donor solvent wanes and the coal hydrogenation primarily occurs by catalyzed monatomic hydrogen addition.

In a more particular embodiment, a working suspension is withdrawn from intermediate storage at a rate of about 4.3 gallons per second, and a mixture of carbon monoxide and hydrogen is admixed up to a pressure of between 500 psi and 2000 psi whereupon a programmed heating cycle is initiated to achieve an intermediate holding temperature of about 325° C. (617° F.) and thereafter to a final temperature of about 475° C. (887° F.). This heating may conveniently be achieved through electric immersion heaters in a series of treatment zones, and turbulators may be inserted into the transport tubing to promote more complete mixing of various reactants. Following liquefaction, standard procedures are followed to recover product, donor solvents and reprocessing feedstocks, gasification and coking materials and the like.

The typical anticipated yield for total conversion under these conditions is in excess of 90% for carbonaceous material in the coal and in excess of 60% for the oil portion.

EXAMPLE 5

Gasification

Coal is prepared and introduced into the processor as in the liquefaction example above. The coal feed can optionally be admixed with petroleum coke and or other carbonaceous substances to an extent of about 60% by weight. The steam requirements for complete carbon oxidation at a carbon:water molar ratio of 1:1 will be 1755 pounds of steam per ton of sub-bituminous coal which is 58% carbon on a moisture- and ash-free (maf) basis. If, however, a greater amount of hydrogen is needed or if it is desired to reduce carbon monoxide greater amounts of steam (water) are preferred. Gasification in this example is conducted at atmospheric pressure; ambient pressure gasifiers are relatively easy to configure from light weight sheet metal and light weight tubing.

Gasification can be conducted in parallel with liquefaction of the same coal source. Thus, for this example a substantial carbon monoxide gas content is provided to satisfy the liquefaction needs, and thereafter a second feed from the gasifier contains a minimum of carbon monoxide and a maximum of hydrogen. For some arrangements it is more economical to take a portion of the output of the main liquefaction processor to provide the gasifier feed.

The coal/steam output of the processor is heated allo-thermally to a temperature of between 1200° F. (650° C.) and 1600° F. (870° C.), preferably at a temperature of about 1400° F. (760° F.), whereupon the carbon is oxidized essentially immediately. During cool-down the gas undergoes an ash removal step in a hot cyclone, an aqueous spray containing sulfur compound absorbents prior to extracting the hydrogen/carbon monoxide needs of the liquefaction unit. Thereafter a shift catalyst is introduced to the remaining gas to maximize the oxidation of carbon monoxide with the concurrent production of more hydrogen.

Variations

Although specific embodiments of the present invention have been described above in detail, the description is merely for purposes of illustration. In addition to the embodiments above various modifications of, and equivalent elements and steps corresponding to, the disclosed aspects of the exemplary embodiments, can be made by those skilled in the art without departing from the spirit and scope of the present invention defined in the following claims, the scope of which is to be accorded the broadest interpretation so as to encompass such modifications and equivalent structures.

I claim:

1. A hydrated ambiphilic coal body surface, comprising an ambiphilic coal body surface in association with and juxtaposed to a hydration layer, wherein the coal body surface has intrinsic surfactant-like properties.

2. A hydrated coal body surface according to claim 1, wherein the hydration layer has a thickness in the range of 0.3 to 3 nanometers.

3. A hydrated coal body surface of claim 1, wherein the hydration layer is one to two monolayers thick.

4. The hydrated ambiphilic coal body surface of claim 1, wherein two such coal surfaces each having a hydration layer exhibit a lower tendency to aggregate with each other, than do two substantially anhydrous surfaces of the same type of coal body tend to aggregate in the absence of the hydration layers.

5. The hydrated ambiphilic coal body surface of claim 1, wherein the surface is compatible with a hydrophilic liquid.

6. The hydrated ambiphilic coal body surface of claim 1, wherein the hydration layer is further in association with and juxtaposed to a hydrophilic liquid.

7. The hydrated ambiphilic coal body surface of claim 6, wherein the hydrophilic liquid further comprises an additive to enhance combustion.

8. The hydrated ambiphilic coal body surface of claim 1, wherein the surface is compatible with a hydrophobic liquid.

9. The hydrated ambiphilic coal body surface of claim 1, wherein the coal surface is further comprised of volatiles that lack a hydration layer, and wherein the volatiles are in association with and juxtaposed to a hydrophobic liquid.

10. The hydrated ambiphilic coal body surface of claim 9, wherein the hydrophobic liquid comprises a hydrogen-donating organic substance.

11. The hydrated ambiphilic coal body surface of claim 1, wherein the surface is essentially free of surfactant.

12. The hydrated ambiphilic coal body surface of claim 1, wherein the surface is an exterior surface of the coal body.

13. The hydrated ambiphilic coal body surface of claim 1, wherein the hydration layer is adsorbed to the coal surface.

14. The hydrated ambiphilic coal body surface according to claim 1, wherein at least a molecular monolayer of water adheres to a substantial portion of the coal surface up to a temperature of about 570° F. at ambient pressure.

15. The hydrated ambiphilic coal body surface of claim 1, further comprising a catalyst or catalyst precursor dissolved within the hydration layer.

16. The hydrated ambiphilic coal body surface of claim 1, further comprising a catalyst or catalyst precursor disposed as a solid on the opposite surface of the hydration layer or between the hydration layer and the coal surface.

17. The hydrated ambiphilic coal body surface of claim 16, wherein the catalyst or catalyst precursor is dispersed over at least 40% of the surface, and the surface is selected from the group consisting of an exterior surface and an interior surface of a coal particle.

18. The hydrated ambiphilic coal body surface of claim 1, further comprising an absorbent dissolved within the hydration layer.

19. The hydrated ambiphilic coal body surface of claim 1, further comprising an absorbent present as a solid dispersed at an outer surface of the hydration layer or between the hydration layer and a coal surface.

20. The hydrated ambiphilic coal body surface of claim 19, wherein the absorbent is dispersed over at least 40% of the surface, and the surface is selected from the group consisting of an exterior surface and an interior surface of a coal particle.

* * * * *